United States Patent
Abbas et al.

(10) Patent No.: US 11,756,004 B2
(45) Date of Patent: Sep. 12, 2023

(54) METHODS AND APPARATUS FOR AUTONOMOUS VEHICLE SCHEDULING

(71) Applicant: Ford Global Technologies, LLC, Dearborn, MI (US)

(72) Inventors: Samer Abbas, Dearborn, MI (US); Scott Lauffer, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 16/809,170

(22) Filed: Mar. 4, 2020

(65) Prior Publication Data
US 2020/0202306 A1    Jun. 25, 2020

Related U.S. Application Data

(63) Continuation of application No. 15/247,039, filed on Aug. 25, 2016, now Pat. No. 10,607,192.

(51) Int. Cl.
*G06Q 10/1093* (2023.01)
*G08G 1/00* (2006.01)
(Continued)

(52) U.S. Cl.
CPC ....... *G06Q 10/1095* (2013.01); *G05D 1/0088* (2013.01); *G05D 1/0285* (2013.01);
(Continued)

(58) Field of Classification Search
CPC .. G06Q 10/1095; G06Q 50/30; G05D 1/0088; G05D 1/0285; G08G 1/005; G08G 1/202
See application file for complete search history.

(56) References Cited

U.S. PATENT DOCUMENTS 6,184,802 B1   2/2001   Lamb
7,840,427 B2   11/2010  OSullivan
(Continued)

FOREIGN PATENT DOCUMENTS

CN   105094767   11/2015
CN   105427089   3/2016
(Continued)

OTHER PUBLICATIONS https://www.youtube.com/watch?v=TJ3uyqe1dWY (Year: 2013).*
(Continued)

*Primary Examiner* — Dylan C White
(74) *Attorney, Agent, or Firm* — Frank MacKenzie; Hanley, Flight & Zimmerman, LLC

(57) ABSTRACT

Methods and apparatus for autonomous vehicle scheduling are disclosed herein. An example apparatus includes memory including machine readable instructions and processor circuitry to execute the instructions to determine that a calendar request for a vehicle is associated with a location or a route previously associated with the vehicle, the calendar request to be generated via a user interface application; generate a predicted request for the vehicle in response to the determination that the calendar request is associated with the location or the route previously associated with the vehicle; and generate a prompt to be presented via the user interface application, the prompt associated with the predicted request for the vehicle.

19 Claims, 7 Drawing Sheets

(51) Int. Cl.
*G08G 1/005* (2006.01)
*G05D 1/00* (2006.01)
*G05D 1/02* (2020.01)
*G06Q 50/30* (2012.01)

(52) U.S. Cl.
CPC ............ *G08G 1/005* (2013.01); *G08G 1/202* (2013.01); *G06Q 50/30* (2013.01)

(56) References Cited

U.S. PATENT DOCUMENTS

| | | | |
|---|---|---|---|
| 8,825,362 B2 | 9/2014 | Kirsch | |
| 9,308,879 B2* | 4/2016 | Wright | B60R 16/037 |
| 9,547,309 B2 | 1/2017 | Ross et al. | |
| 9,715,233 B1 | 7/2017 | Mandeville-Clarke et al. | |
| 9,965,960 B1 | 5/2018 | McDavitt-Van Fleet | |
| 10,126,138 B1 | 11/2018 | Farmer et al. | |
| 10,395,333 B2* | 8/2019 | Dicker | G06Q 30/0206 |
| 10,607,192 B2* | 3/2020 | Abbas | G08G 1/202 |
| 11,206,223 B2* | 12/2021 | Dotan-Cohen | H04L 67/303 |
| 2006/0059023 A1 | 3/2006 | Mashinsky | |
| 2006/0089787 A1 | 4/2006 | Burr et al. | |
| 2009/0089105 A1 | 4/2009 | Wu | |
| 2009/0177502 A1 | 7/2009 | Doinoff et al. | |
| 2010/0250292 A1 | 9/2010 | Wurster | |
| 2012/0041675 A1 | 2/2012 | Juliver et al. | |
| 2012/0109721 A1 | 5/2012 | Cebon et al. | |
| 2013/0132140 A1 | 5/2013 | Amin et al. | |
| 2013/0151149 A1 | 6/2013 | Kristinsson et al. | |
| 2013/0246207 A1 | 9/2013 | Novak et al. | |
| 2014/0180746 A1 | 6/2014 | Lehmann et al. | |
| 2014/0195469 A1 | 7/2014 | Barrett et al. | |
| 2014/0278086 A1 | 9/2014 | San Filippo et al. | |
| 2014/0288832 A1 | 9/2014 | Hoch et al. | |
| 2015/0039362 A1 | 2/2015 | Haque | |
| 2015/0039366 A1 | 2/2015 | Haque | |
| 2015/0338852 A1* | 11/2015 | Ramanujam | G08G 1/202 |
| | | | 701/2 |
| 2015/0346727 A1 | 12/2015 | Ramanujam | |
| 2016/0042303 A1 | 2/2016 | Medina et al. | |
| 2016/0275638 A1 | 9/2016 | Korpi et al. | |
| 2017/0169366 A1 | 6/2017 | Klein et al. | |
| 2017/0316696 A1 | 11/2017 | Bartel | |
| 2017/0352125 A1 | 12/2017 | Dicker et al. | |
| 2017/0365030 A1* | 12/2017 | Shoham | G08G 1/202 |
| 2018/0060827 A1 | 3/2018 | Abbas et al. | |
| 2018/0091605 A1 | 3/2018 | Nickels et al. | |
| 2018/0188731 A1* | 7/2018 | Matthiesen | G01C 21/3664 |
| 2018/0211541 A1* | 7/2018 | Rakah | G08G 1/148 |
| 2018/0231984 A1 | 8/2018 | Alonso-Mora et al. | |
| 2018/0260787 A1* | 9/2018 | Xi | G01C 21/3438 |
| 2018/0293687 A1* | 10/2018 | Hardee | G08G 1/202 |
| 2018/0315146 A1* | 11/2018 | Matthiesen | G01C 21/3453 |
| 2019/0045516 A1* | 2/2019 | Hu | H04W 72/085 |
| 2019/0370924 A1 | 12/2019 | Kassner et al. | |
| 2020/0076941 A1* | 3/2020 | Zilka | G06F 3/0482 |
| 2020/0202306 A1* | 6/2020 | Abbas | G05D 1/0088 |
| 2020/0326200 A1* | 10/2020 | Mizoguchi | G01C 21/3423 |
| 2021/0306812 A1* | 9/2021 | Gross | G06F 3/04883 |

FOREIGN PATENT DOCUMENTS

| | | | |
|---|---|---|---|
| JP | 2006083800 | 3/2006 | |
| TW | 201007203 A | 2/2010 | |
| WO | 2015076915 | 5/2015 | |
| WO | 2015169204 | 11/2015 | |
| WO | 2018111259 | 6/2018 | |
| WO | WO-2019172929 A1 * | 9/2019 | ......... G06F 16/2428 |
| WO | WO-2021029822 A8 * | 3/2021 | |

OTHER PUBLICATIONS

United Stated Patent and Trademark Office, "Notice of Allowance," issued in connection with U.S. Appl. No. 15/247,039, dated Nov. 20, 2019, 10 pages.

United States Patent and Trademark Office, "Non-Final Office Action," issued in connection with U.S. Appl. No. 15/247,039, dated Feb. 4, 2019, 9 pages.

United States Patent and Trademark Office, "Final Office Action," issued in connection with U.S. Appl. No. 15/247,039, dated Jul. 5, 2019, 13 pages.

Saini et al., "Scheduling Automatic Pickup by Self-driving Cars," Technical Disclosure Commons Defensive Publications Series, Feb. 19, 2016, available at http://www.tdcommons.org/dpubs_series/160?utm_source=www.tdcommons.org%2Fdpubs_series%2F160&utm_medium=PDF&utm_campaign=PDFCoverPages, 7 pages.

UK Intellectual Property Office, "Examination Opinion," issued in connection with Britsh Patent Application No. GB1713278.8, dated Feb. 14, 2018, 5 pages.

United States Patent and Trademark Office, "Restriction Requirement," issued in connection with U.S. Appl. No. 15/247,039, dated Oct. 25, 2018, 5 pages.

The State Intellectual Property Office of People's Republic of China, "First Office Action," issued in connection with Chinese Patent Application No. 201710710847.2, dated Nov. 18, 2022, 28 pages (English translation provided).

China National Intellectual Property Administration, "Notification of Second Office Action," issued in connection with Chinese Patent Application No. 2017107108472, dated Apr. 6, 2023, 14 pages (English translation included).

* cited by examiner

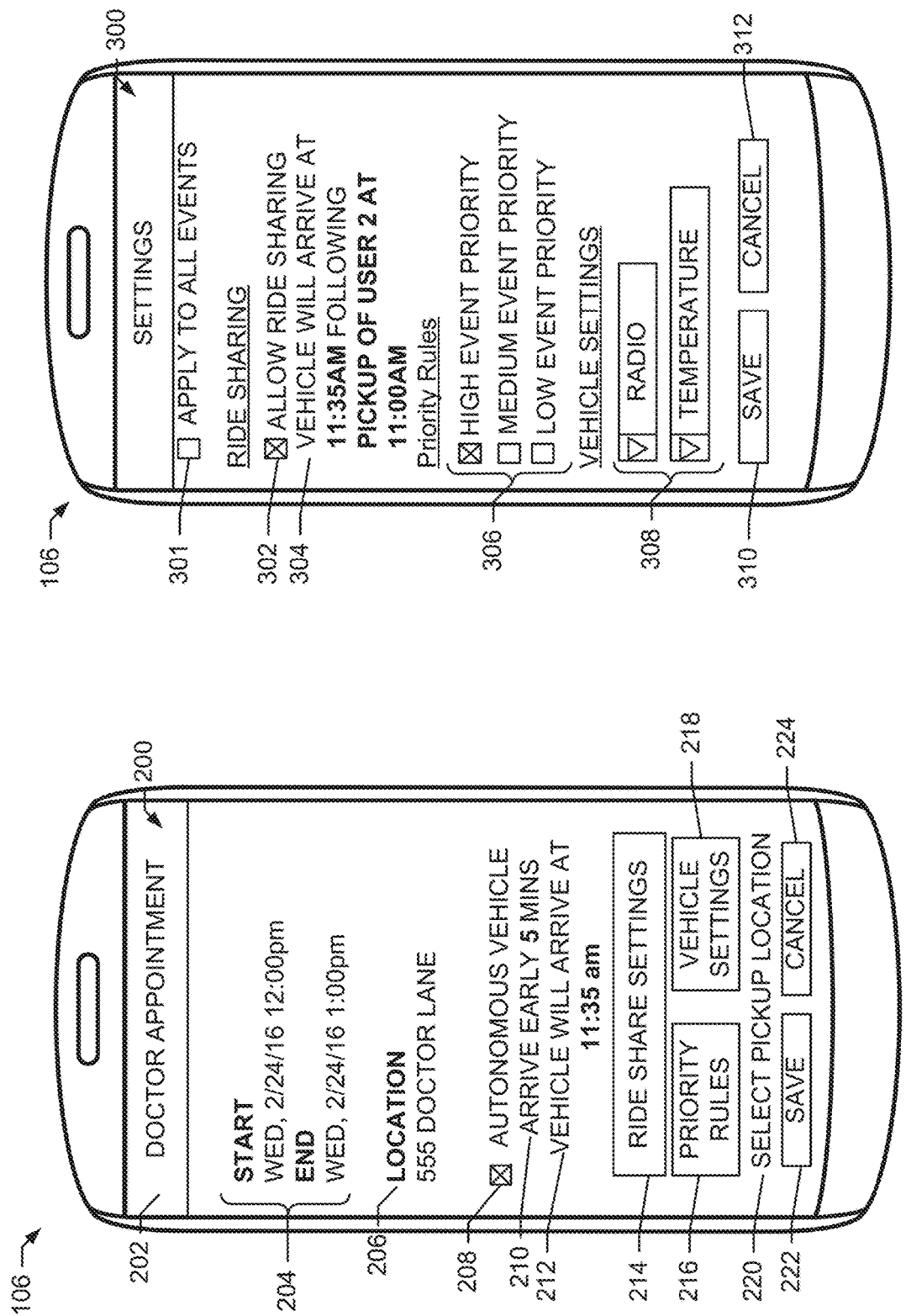

METHODS AND APPARATUS FOR AUTONOMOUS VEHICLE SCHEDULING

RELATED APPLICATION

This patent arises from a divisional of U.S. patent application No. 15/247,039, now U.S. Pat. No. 10,607,192, titled "Methods and Apparatus for Autonomous Vehicle Scheduling," and filed on Aug. 25, 2016. U.S. patent application No. 15/247,039 is hereby incorporated herein by reference in its entirety. Priority to U.S. patent application No. 15/247,039 is hereby claimed.

FIELD OF THE DISCLOSURE

This disclosure relates generally to autonomous vehicles and, more particularly, to autonomous vehicle scheduling.

BACKGROUND

A user of an autonomous vehicle typically requests that the autonomous vehicle arrive at a location to retrieve the user and drive the user to one or more destinations. Use of the autonomous vehicle is often associated with the availability of the vehicle relative to scheduling demands placed on the vehicle by other users.

SUMMARY

An example method disclosed herein includes receiving, at a first processor, a first request for a vehicle to travel to a location. The first request is to be transmitted to the first processor from a second processor. The example method includes calculating an arrival time of the vehicle based on the first request. The example method includes comparing the first request to a second request for the vehicle based on the arrival time, scheduling the first request based on the comparison, and directing the vehicle to the location based on the schedule.

Another example method disclosed herein includes receiving, via a first processor, first calendar event data. The first calendar event data is to be transmitted to the first processor from a second processor. The example method includes determining whether the first calendar event data includes a request for a vehicle. If the first calendar event data does not include the request, the example method includes analyzing the first calendar event data and second calendar event data and generating a predicted request for the vehicle based on the analysis. The predicted request is to be associated with the first calendar event data. The example method includes scheduling the predicted request.

An example system disclosed herein includes a request receiver to receive a first request for a vehicle to travel to a first location from a first processor and a second request for the vehicle to travel to a second location from a second processor. The example system includes an analyzer to determine a first arrival time of the vehicle at the first location based on the first request and a second arrival time of the vehicle at the second location based on the second request. The analyzer is to perform a comparison of the first arrival time and the second arrival time and identify one or more rules associated with the first request or the second request. The analyzer is to schedule at least one of the first request or the second request based on the comparison and the identification of the one or more rules. In the example system, at least one of the request receiver or the analyzer is to be implemented via a third processor.

BRIEF DESCRIPTION OF THE DRAWINGS

FIG. 2 illustrates a first example screen of an example graphical user interface associated with the example mobile devices of FIG. 1.

FIG. 3 illustrates a second example screen of an example graphical user interface associated with the example mobile devices of FIG. 1.

The figures are not to scale. Wherever possible, the same reference numbers will be used throughout the drawing(s) and accompanying written description to refer to the same or like parts.

DETAILED DESCRIPTION

Figure 1:
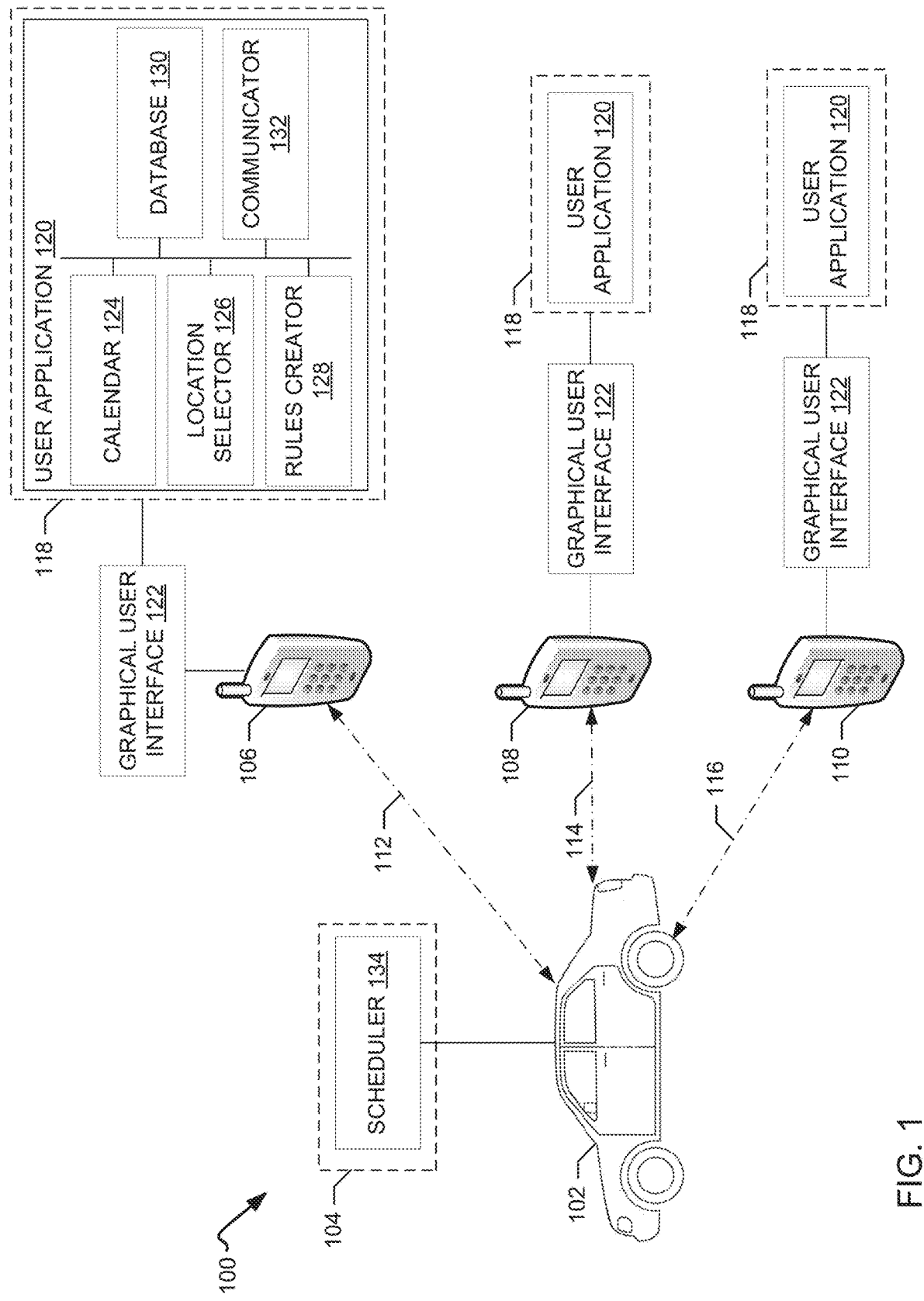
FIG. 1 illustrates an example system including an example vehicle and example mobile devices for interacting with a control system of the example vehicle in accordance with the teachings disclosed herein.

As autonomous vehicle usage becomes more prevalent, autonomous vehicles may serve as a primary vehicle for, for example, a family or group of individuals such as a employees at a business. An individual seeking to use an autonomous vehicle (hereinafter generally "the vehicle") as a mode of transportation may have multiple trips to make throughout the day. Whether or not the individual is able to use the autonomous vehicle for the one or more trips depends on the availability of the vehicle. Multiple users wishing to use the vehicle for one or more trips on the same day place scheduling demands on the vehicle.

To request the vehicle, a user can access a user application associated with the autonomous vehicle that allows for scheduling of the vehicle via a user devices (e.g., a smartphone, a personal computer). However, requesting the vehicle for every trip, including trips that are made on a regular basis, through a dedicated user application may not be efficient. Further, users within, for example, the same family or a group of co-workers, may share calendars through one or more user calendar applications (e.g., Google® Calendar, Yahoo!® Calendar, Outlook®). Reconciling scheduling of the vehicle through a dedicated user application in light of events scheduled through a calendar application may be difficult in view of, for example, access to the calendar application by different users.

Example systems and methods disclosed herein integrate scheduling of an autonomous vehicle with calendar applications such that when a user enters an event in the calendar application, the user can request the vehicle through the calendar application. When the user creates a new event via the calendar application, the user is automatically given the option to request the vehicle within the same calendar application. The examples disclosed herein also enable a user to view the schedule of the vehicle to determine when the vehicle is available for one or more trips. Also, the disclosed examples provide for user inputs such as pickup location preferences and vehicle arrival time without requiring the user to access a separate application.

When a user enters a new calendar event, the disclosed examples automatically evaluate the new event in view of previously scheduled calendar events and detect scheduling conflicts relative to availability of the vehicle. The disclosed examples automatically analyze the new calendar event in view of previously entered calendar events to identify vehicle location, calculate travel times between destinations, and determine whether the vehicle is available for the newly schedule event. The disclosed examples provide for resolution of scheduling conflicts based on user inputs and/or prioritization rules. The disclosed examples also optimize usage of the vehicle by providing for rideshare scheduling, or the grouping of multiple trips for different users through shared use of the vehicle based on, for example, overlapping routes.

The examples disclosed herein also predict vehicle use based on an analysis of historical vehicle usage data, including, for example, patterns with respect to a user's calendar events and vehicle scheduling requests. In view of the predictive analysis, the disclosed examples automatically request the vehicle in connection with a calendar event associated with a known location and/or route. The user can confirm the predicted vehicle request.

An example system 100 for scheduling of an autonomous vehicle 102 is illustrated in FIG. 1. The example vehicle 102 includes a first processor 104. The first processor 104 controls and/or provides for example, infotainment services such as music and navigation to a destination via Global Positioning Satellite (GPS) information. In the example system 100 of FIG. 1, the first processor 104 of the vehicle 102 is in wireless communication with a first mobile device 106, a second mobile device 108, and a third mobile device 110, as represented by respective first, second, and third arrows 112, 114, 116 in FIG. 1. Although three mobile devices 106, 108, 110 are illustrated in FIG. 1, the first processor 104 of the vehicle 102 can be in communication with additional or fewer mobile devices. The first, second, and third mobile devices 106, 108, 110 can belong to, for example, users of the vehicle 102. The first, second, and third mobile devices 106, 108, 110 of the example system 100 can be smartphones, tablets, or other devices having wireless communication capability. Each of the first, second, and third mobile devices 106, 108, 110 includes a second processor 118.

Respective users of the mobile devices 106, 108, 110 may wish to use the vehicle 102 as a mode of transportation for reaching a destination. For example, a first user of the first mobile device 106 may wish to have the vehicle 102 pick the first user up from a first location and drive the user to a second location at a first time (e.g., 9 am). A second user of the second mobile device 108 may wish to the have the vehicle 102 pick the second user up from a third location and drive the second user to a fourth location at a second time (e.g., 9:30 am). A third user of the third mobile device may wish to have the vehicle 102 pick the third user up from a fifth location and drive the third user to a sixth location at a third time (e.g., 3 pm).

In the example system 100, the wireless communication between the respective first, second, and third mobile devices 106, 108, 110 and the first processor 104 of the vehicle 102 provides for scheduling of requests for the vehicle 102. The second processor 118 of each of the first, second, and third mobile devices includes a user application 120, which may have been installed by users of each of the first, second, and third mobile devices 106, 108, 110. The respective users of the first, second, and third mobile devices 106, 108, 110 interact with the user application 120 via a respective graphical user interface (GUI) 122. The user application 120 installed on each of the first, second, and third mobile devices 106, 108, 110 enables the first, second, and third users to receive information from and send information to the first processor 104 of the vehicle 102 with respect to requests for the vehicle 102.

For illustrative purposes, the user application 120 will be discussed with respect to the first mobile device 106 with the understanding that the user application 120 installed on the second mobile device 108 and the third mobile device 110 is substantially the same. The user application 120 includes a calendar 124. In some examples, the calendar 124 is associated with another user application installed on the first mobile device 106, such as a third party calendar application (e.g., Google® Calendar, Yahoo!® Calendar, Outlook®). The calendar 124 allows the first user of the first mobile device 106 to input, via the GUI 122 of the first mobile device 106, a calendar event, such as an upcoming appointment. The first user can input the name of the event (e.g., doctor's appointment), start and end times for the event, and a location of the event. Also, when entering the information about the calendar event, the first user can request the vehicle 102 for the event via the calendar 124 of the user application 120. Thus, the first user does not have to access separate applications for creating calendar events and requesting the vehicle 102.

The user application 120 includes a location selector 126. Upon receipt of a user input that the first user requests the vehicle 102 for the event, the location selector 126 prompts the first user to select a pickup location, or a position at the event location where the first user would like the vehicle 102 to pick up the first user. For example, upon entering the location of the event in the calendar 124 of the user application 120, the location selector 126 displays a map of the location of the event via the GUI 122 of the first mobile device 106. The first user can select a position at the location where the first user would like to be picked up by the vehicle 102 via the location selector 126. For example, the first user can drag a pin or click on the map to select the pickup position at the location, such as a front door of a building or a nearby street intersection.

The user application 120 includes a rules creator 128. The rules creator 128 allows the first user to enter one or more rules with respect to prioritization of calendar events entered by the first user, the second user via the second mobile device 108, and/or the third user via the third mobile device 110. The first user enters the rules via the GUI 122. For example, the first user can enter a rule that calendar events entered by the first user should be given priority over calendar events created by the second user and/or the third user in the case of scheduling conflicts. Thus, the rules creator 128 allows for the creation of default rules with respect to users creating calendar events via the user application 120 on the first, second, and third mobile devices 106, 108, 110. Also, in some examples, a rule created via the rules creator 128 is related to one or more settings of the vehicle 102. For example, the first user can create a rule that if the vehicle 102 detects that the outside temperature is below a predetermined temperature threshold, the vehicle 102 should automatically turn on the heat in the vehicle 102 when the vehicle 102 picks up the first user. In other examples, the first user creates one or more rules when creating a new calendar event via the calendar 124, as will be disclosed below.

The user application 120 includes a database 130 to store the user inputs. The user application 120 also includes a communicator 132. The communicator 132 transmits the data stored in the database 130, such as the calendar event start and end times, the event location, the request for the vehicle 102, the selected pickup position, etc., to the first processor 104 of the vehicle 102.

The data transmitted by the communicator 132 of the user application of the first mobile device 106 to the first processor 104 of the vehicle 102 is processed by a scheduler 134. In some examples, the first processor 104 receives data including calendar events and vehicle requests from the second mobile device 108 and/or the third mobile device 110. The scheduler 134 determines whether the vehicle 102 is available for the requests associated with the calendar events received from the first, second, and/or third mobile devices 106, 108, 110. To determine whether the vehicle 102 is available for a particular vehicle request, the scheduler 134 considers, for example, previously scheduled calendar events, location of the vehicle 102, and the priority rules created via the rules creator 128 of the user application 120. The scheduler 134 communicates with the first, second, and third mobile devices 106, 108, 110 to confirm use of the vehicle 102 or to alert the users of the mobile devices 106, 108, 110 of scheduling conflicts. The scheduler 134 schedules the vehicle requests based on an analysis of, for example, calendar event data, previously scheduled events, and vehicle usage patterns detected in the calendar event data.

FIG. 2 illustrates a first example screen 200 of the example GUI 122 of the first mobile device 106 of FIG. 1 for entering a calendar event and requesting an autonomous vehicle for the event, such as the vehicle 102 of FIG. 1. Although the first example screen 200 is shown in FIG. 2 in connection with the first mobile device 106, the first example screen 200 can be displayed via the GUIs 122 associated with the second mobile device 108 and/or the third mobile device 110 of FIG. 1.

The first example screen 200 provides for user inputs with respect to a calendar event 202. The first user of the first mobile device 106 can enter the calendar event 202 by providing an input using the first mobile device 106, such as via typing or audio. For example, the first user can enter a name for the calendar event 202, such as "Doctor's Appointment." The first example screen 200 also includes event time fields 204 including start and end dates and times for the calendar event 202. The event time fields 204 can include text boxes and/or drop-down menus for entry of the event start and end dates and times. The first example screen 200 also includes an event location field 206 to receive a user input with respect to the location of the calendar event 202.

As disclosed above, in some examples, the first user of the mobile devices 106 wishes to use the autonomous vehicle 102 of FIG. 1 to reach the location of the calendar event 202 and/or leave the location of the calendar event 202. In such examples, the first user provides a user input to request the vehicle 102 via a vehicle request field 208 of the first example screen 200. For example, the vehicle request field 208 can include a checkbox or other selection tool that allows the first user to request the vehicle 102 in connection with the calendar event 202.

The first example screen 200 includes an arrival buffer field 210. The first user enters an amount of time in the arrival buffer field 210 to indicate how far in advance of the start time and/or the end time the first user wants the vehicle 102 to arrive to drive the first user to the event location and/or pick up the first user from the event location. The arrival buffer field 210 can include, for example, a text field or drop-down menu that allows the first user to provide an input indicating how much time in advance of the start and/or end time the first user would like the vehicle 102 to arrive. In some examples, the arrival buffer field 210 is selectively displayed via the first example screen 200 if the first user requests the vehicle 102 via the vehicle request field 208. Also, in some examples, the arrival buffer field 210 includes two or more fields to receive vehicle buffer times for arrival of the vehicle 102 to drive the first user to the location of the calendar event 202 and for arrival of the vehicle 102 to retrieve the first user from the location of the calendar event 202.

The first example screen 200 includes a vehicle arrival time field 212. As will be disclosed below, based on the location of the calendar event 202, the start and end dates and times of the calendar event 202, the request for the vehicle 102, and the vehicle arrival buffer time(s), the scheduler 134 of the first processor 104 of the calculates the arrival time for the vehicle 102 at (1) a starting location of the first user to drive the first user to the location of the calendar event 202 and/or (2) at the location of the calendar event 202 to retrieve the first user from the location of the calendar event 202. The vehicle arrival time field 212 displays the arrival time of the vehicle 102 at the starting location of the user and/or at the location of the calendar event.

The vehicle arrival time field 212 is auto-populated with an arrival time of the vehicle 102 based on data received from the scheduler 134, as will be disclosed below. If the scheduler 134 determines that the vehicle 102 is available for the calendar event 202, the scheduler 134 sends arrival time data to the user application 120, which is used to populate the vehicle arrival time field 212. In some examples, if the scheduler 134 determines that the vehicle 102 is not available for the calendar event 202, the scheduler 134 instructs the user application 120 to populate the vehicle arrival time field 212 with an indicator that the vehicle 102 is not available. For example, the vehicle arrival time field 212 can include indicators such as an "X" or "N/A" to inform the first user that the vehicle 102 is not available. In other examples, the scheduler 134 determines that the vehicle 102 is not available at the requested time, but is available at a different time. In some such examples, the scheduler 134 instructs the user application 120 to populate the vehicle arrival time field 212 with an arrival time and to mark the arrival time (e.g., in italics, in bold, etc.) to indicate that the arrival time is a proposed alternative time.

The first example screen 200 of the user application 120 also includes one or more menus that allow the first user to define and/or view additional settings with respect to the vehicle request for the calendar event 202. The menus are associated with the rules creator 128 of the user application 120 and provide for the creation and/or viewing of event- or user-specific rules.

The first example screen 200 includes a rideshare settings menu 214. The rideshare settings menu 214 allows the first user to enable ridesharing such that vehicle 102 may make one or more trips before and/or after driving the first user to the location of the calendar event 202 or retrieving the first user from the location of the calendar event 202.

The first example screen 200 includes a priority rules menu 216. As disclosed above with respect to the rules creator 128 of the user application 120 of FIG. 1, the user application 120 provides for the creation of rules with respect to how calendar events created by the first, second, and/or third users are handled by the scheduler 134 in the event of, for example, scheduling conflicts. The priority rules menu 216 of the first example screen 200 also allows the first user to create an event specific rule for the calendar event 202. For example, the first user can create a rule that the calendar event 202 should be considered a priority event over other conflicting calendar events.

The first example screen 200 also includes a vehicle settings menu 218. As disclosed above with respect to the rules creator 128 of the user application 120 of FIG. 1, the user application 120 provides for the creation of rules with respect to settings of the vehicle 102 for calendar events 202 created by the first, second, and/or third users. The vehicle settings menu 218 allows the first user to specify one or more settings for the vehicle 102 when the vehicle 102 picks up the first user to take the first user to the calendar event 202 or retrieves the first user from the calendar event 202 and, thus, provides for event-specific vehicle settings. For example, the first user can create a vehicle setting that the heat should be on in the vehicle 102 when the vehicle 102 arrives to retrieve the first user from the location of the calendar event 202. Other examples of vehicle settings include radio presets, which door should be unlocked for the first user to enter the vehicle 102, etc.

The first example screen 200 also includes a pickup position field 220. The pickup position field 220 allows the user to select a position on a map where the first user would like to be picked up by the vehicle 102 at the starting location of the first user and/or at the location of the calendar event 202. As will be disclosed below, in some examples, upon selection of the pickup position field 220, a new screen is displayed via the GUI 122 of the first mobile device 106 to allow the first user to provide one or more user inputs with respect to pickup positions at the locations via a map. The first example screen 200 includes also a confirmation button 222 for the first user select to save the calendar event 202 and a cancel button 224 to discard the calendar event 202. In saving the calendar event 202, the first user confirms the (e.g., proposed) arrival time auto-populated in the vehicle arrival time field 212 and, thus, confirms the vehicle request (or the denial of the vehicle request if the vehicle 102 is not available).

FIG. 3 illustrates a second example screen 300 of the example GUI 122 associated with the first mobile device 106 of FIG. 1 for defining and/or viewing one or more settings of the vehicle 102. The second example screen 300 of FIG. 3 can be viewed upon selection of, for example, the rideshare settings menu 214, the priority rules menu 216, and/or the vehicle settings menu 218. The second example screen 300 can include additional or fewer menus than illustrated in FIG. 3. Although the second example screen 300 is shown in FIG. 3 in connection with the first mobile device 106, the second example screen 300 can be displayed via the GUIs 122 associated with the second mobile device 108 and/or the third mobile device 110 of FIG. 1. Also, although the second example screen 300 is illustrated in FIG. 3 as a different screen relative to the first example screen 200 of FIG. 2, in some examples, the second example screen 300 is displayed via the GUI 122 with the first example screen 200 (e.g., as a pop-up window, an overlay screen, and/or as part of the first example screen 200).

The second example screen 300 is displayed in connection with the rules creator 128 of the user application 120. The rules creator 128 allows for the creation of rules on a user-basis or an event-basis. The second example screen 300 includes a rule definer field 301 that allows the first user to indicate whether one or more settings defined via the second example screen 300 should be applied to all events created by the first user (e.g., default rule(s)) or should only apply to the calendar event 202.

The second example screen 300 includes a rideshare settings field 302 associated with the rideshare settings menu 214 of FIG. 2. The rideshare settings field 302 allows the first user to select whether or not the calendar event 202 can be grouped with other calendar events (e.g., other calendar events entered by the first, second, or third users via the respective user applications 120) with respect to usage of the vehicle 102. In some examples, the rideshare settings field 302 is selected by default to enable ridesharing. As will be disclosed below, if the scheduler 134 of the vehicle 102 of FIG. 1 determines that rideshare opportunities are available for grouping calendar events 202 with respect to use of the vehicle 102, a rideshare details field 304 of the example second screen 300 is auto-populated based on data received by the user application 120 from the scheduler 134. For example, the rideshare details field 304 contains information with respect to other trips the vehicle 102 may make before and/or after the calendar event 202. Thus, in some examples, the rideshare details field 304 provides additional details with respect to the arrival time of the vehicle 102 proposed by the scheduler 134 and displayed via the vehicle arrival time field 212 of the first example screen 200 of FIG. 2.

The second example screen 300 includes an event priority selector 306 associated with the priority rules menu 216 of FIG. 2. The event priority selector 306 allows the first user to assign a priority level to the calendar event 202 to define how the calendar event 202 is treated in view of other calendar events with respect to scheduling conflicts. For example, if the calendar event 202 is assigned a high priority via the event priority selector 306, the calendar event 202 may override another event scheduled for the same time when evaluated by the scheduler 134. As another example, if the calendar event is assigned medium or low event priority, the scheduler 134 of FIG. 1 identifies the calendar event 202 as an event that can be rescheduled or cancelled if there is a scheduling conflict with another event. In some examples, the event priority selector 306 includes a text box for the entry of event-specific priority rules by the first user.

The second example screen 300 includes a vehicle settings selector 308 associated with the vehicle settings menu 218 of FIG. 2. The vehicle settings selector 308 includes one or more vehicle settings for selection by the first user, such as a radio station that the first user prefers that the vehicle 102 play when the vehicle 102 arrives for the first user and/or a temperature setting of the vehicle 102 (e.g., instructing the vehicle 102 to have the heat turned on when the vehicle 102 arrives for the first user). The second example screen 300 also a confirmation button 310 for the first user select to save the settings and a cancel button 312 to discard the settings. In some examples, by selecting the confirmation button 310, the first user confirms the ridesharing details proposed by the scheduler 134 via the rideshare details field 304.

Figure 4:
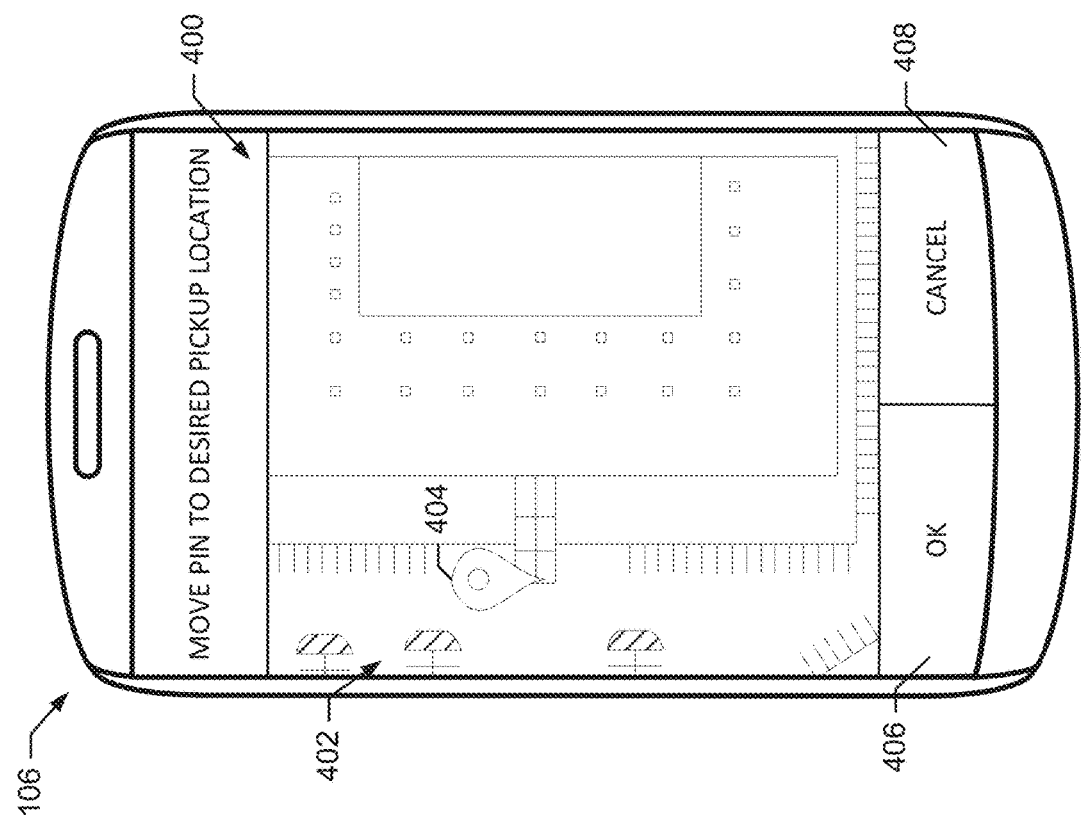
FIG. 4 illustrates a third example screen of an example graphical user interface associated with the example mobile devices of FIG. 1.

FIG. 4 illustrates a third example screen 400 of the example GUI 122 associated with the first mobile device 106 of FIG. 1 for selecting a pickup position at a location by the vehicle 102. The second example screen 400 is associated with the location selector 126 of the user application 120 of FIG. 1 and, more particularly, the pickup position field 220 of the first example screen 200 of FIG. 2. Although the third example screen 400 is shown in FIG. 3 in connection with the first mobile device 106, the third example screen 400 can be displayed via the GUIs 122 associated with the second mobile device 108 and/or the third mobile device 110 of FIG. 1. Also, although the third example screen 400 is illustrated in FIG. 4 as a different screen relative to the first example screen 200 of FIG. 2 and the second example screen 300 of FIG. 3, in some examples, the third example screen 400 is displayed via the GUI 122 with the first example screen 200 or the second example screen 300 (e.g., as a pop-up window, an overlay screen, and/or as part of the first or second example screens 200, 300).

As illustrated in FIG. 4, the third example screen 400 includes a map 402. In some examples, the map 402 is a map of the starting location of the first user. The starting location of the first user can be a current location of the first user as detected using, for example, a GPS of the first mobile device 106. In other examples, the scheduler 134 of the first processor 104 automatically determines the starting location of the first user based on prior calendar events and directs the user application 120 to display the map 402 based on the determination. In other examples, the map 402 is a map of the location of the calendar event 202 based on the data entered in the location field 206 of the first example screen 200 and processed by the scheduler 134.

The map 402 of the third example screen 400 includes a position selector 404. The position selector 404 can be, for example, a pin or other graphical representation. The first user interacts with the map 402 by selectively moving (e.g., dragging via a touch screen) the position selector 404 to the position on the map 402 where the first user would like the vehicle 102 to arrive. For example, the first user can move the position selector 404 to a front of a building displayed on the map 402 to instruct the vehicle 102 to arrive at the front of building. As another example, the first user can move the position selector 404 to a street intersection near the building to instruct the vehicle 102 to arrive at the intersection rather than at the building. The third example screen 400 includes a confirmation button 406 for selection by the first user to confirm the pickup position as indicated by the location of the position selector 404 on the map 402 and a cancel button 408 to discard the changes.

In some examples, after the first user saves the selection of the position selector 404 via the third example screen 400 of FIG. 4, the first user is returned to the first example screen 200 of FIG. 2. The first user can select the confirmation button 222 of the first example screen 200 to save the calendar event 202 and associated settings parameters, including the arrival time of the vehicle 102 proposed by the scheduler 134, to the calendar 124 of the user application 120 of FIG. 1. In some examples, the calendar event 202 is shared with other users (e.g., the second user of the second mobile device 108 and/or the third user of the third mobile device 110) who also access the calendar 124.

Figure 5:
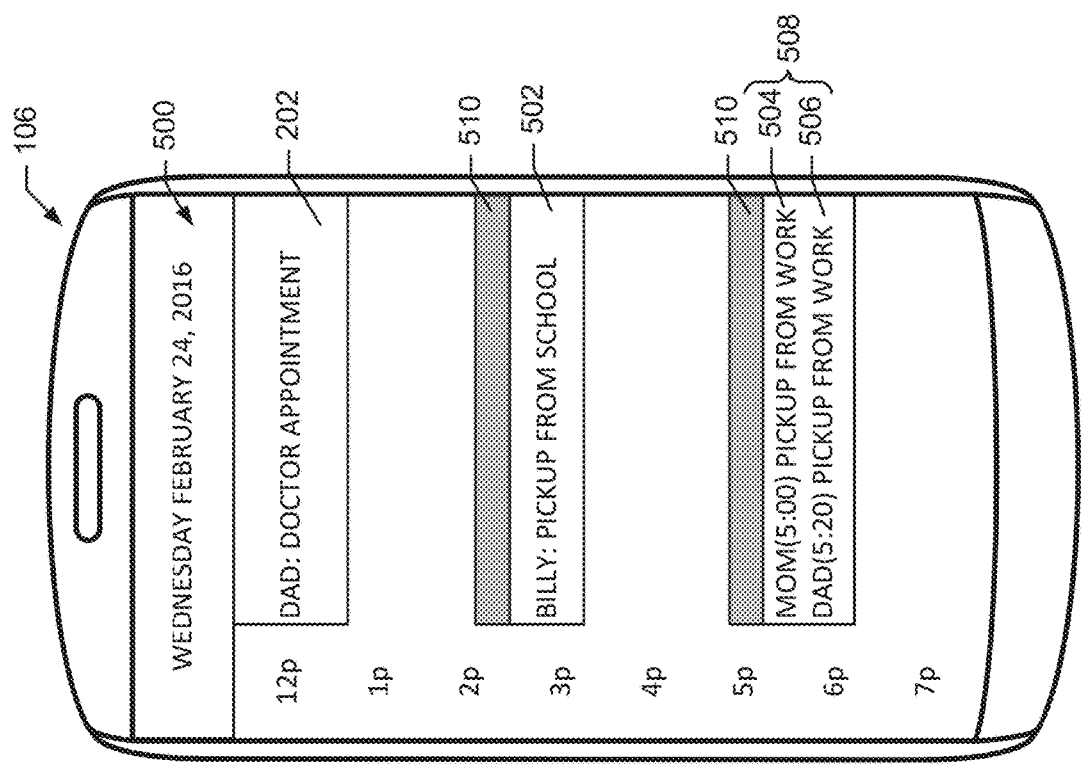
FIG. 5 illustrates a fourth example screen of an example graphical user interface associated with the example mobile devices of FIG. 1.

FIG. 5 illustrates a fourth example screen 500 of the example GUI 122 associated with the first mobile device 106 of FIG. 1 for viewing calendar events created by the first, second, and/or third users via the respective user application 120 of the first, second, or third mobile devices 106, 108, 110. Although the fourth example screen 500 is shown in FIG. 5 in connection with the first mobile device 106, the fourth example screen 500 can be displayed via the GUIs 122 associated with the second mobile device 108 and/or the third mobile device 110 of FIG. 1.

In some examples, the first user may wish to view the schedule of the vehicle 102 before requesting the vehicle 102 via the user application 120. For example, if the start and/or end times of the calendar event 202 are flexible, the first user may wish to view the calendar events that have been scheduled by the second and/or third users via the user application 120 to see when the vehicle 102 is available and/or to schedule a calendar event in connection with a previously scheduled event so as to share a ride with the user of the previously scheduled event. As illustrated in FIG. 5, the fourth example screen 500 displays one or more calendar events entered by users of, for example, the first, second, and/or third mobile devices 106, 108, 110 via the calendar 124 of the user application 120 installed on each of the mobile devices 106, 108, 110 as substantially disclosed above in connection with the example screens 200, 300, 400 of FIGS. 2-4. For example, the fourth example screen 500 displays the calendar event 202 created via the first example screen 200 of FIG. 2 by the first user of the first mobile device 106. The fourth example screen 500 also displays a second calendar event 502, a third calendar event 504, and a fourth calendar event 506 created by the users of the first, second, and/or third mobile devices 106, 108, 110. The fourth example screen 500 of FIG. 5 can display additional or fewer calendar events.

In some examples, two or more of the calendar events 202, 502, 504, 506 are displayed via the fourth example screen 500 as a grouped event 508 indicating that the events are rideshared events with respect to the use of the vehicle 102. In the example of FIG. 5, the third calendar event 504 and the fourth calendar event 506 are rideshared events forming the grouped event 508. For example, the vehicle 102 will retrieve the user associated with the third calendar event 504 and then retrieve the user associated with the fourth calendar event 506 as part of a single trip for the vehicle 102 (e.g., the user associated with the third calendar event is in the vehicle 102 when the vehicle 102 retrieves the user associated with the fourth calendar event 506). The rideshared calendar events 504, 506 can be visually distinguished from the other calendar events 202, 502 via the fourth example screen 500 through color coding and/or other graphical distinctions (e.g., graphical symbols, shading, etc.). In some examples, the fourth example screen 500 includes one or more rideshare time markers 510, which indicate that certain times are reserved for rideshared events. In examples where the first user views the schedule of the vehicle 102 before requesting the vehicle 102, the rideshare time marker(s) 510 inform the first user as to whether a calendar event scheduled during a predefined time will be grouped with other calendar events for ridesharing purposes.

FIGS. 2-5 illustrate examples screens of the calendar 124 and the location selector 126 of the user application 120 for creating a calendar event 202, 502, 504, 506 and requesting the vehicle 102 for the calendar event 202, 502, 504, 506. As illustrated in the fourth example screen 500 of FIG. 5, each user of the first, second, and third mobile devices 106, 108, 110 can create calendar events 202, 502, 504, 506 via the user application 120 installed on the mobile devices 106, 108, 110. In creating calendar events, each of the users can request the vehicle 102 for the events. However, scheduling conflicts can arise based on the calendar events and the availability of the vehicle 102. The scheduler 134 of the first processor 104 of the vehicle 102 manages the requests for the vehicle 102 in view of the calendar events 202, 502, 504, 506.

Figure 6:
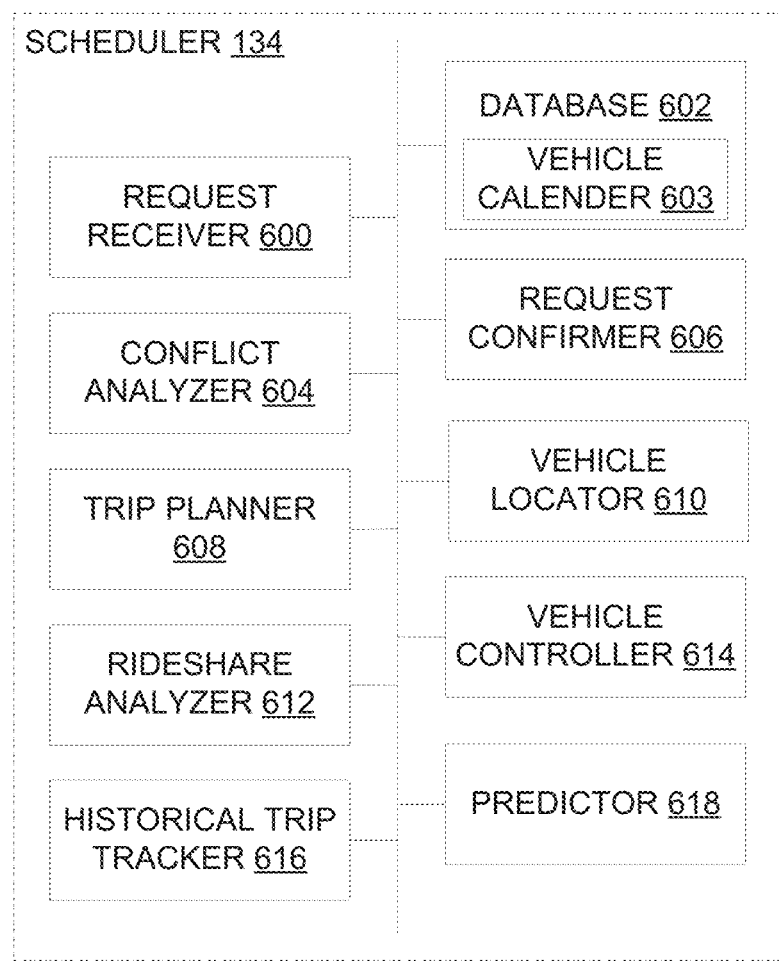
FIG. 6 is a block diagram of an example control system for use with the example vehicle of FIG. 1.

FIG. 6 is a block diagram of the example scheduler 134 of FIG. 1. The scheduler 134 includes a request receiver 600.

The request receiver 600 receives calendar events created via the user application 120 of the first, second, and/or third mobile devices 106, 108, 110 and transmitted to the scheduler 134 via the communicator 132 of the user application 120. For example, when the first, second, and/or third users of the mobile devices 106, 108, 110 enter a new calendar event via the user application 120 (e.g., the calendar events 202, 502, 504, 506 of FIG. 2-5), the communicator 132 of the user application 120 sends the calendar event data (e.g., data received in connection with the event time fields 204, the location field 206, the vehicle request field 208, the arrival buffer field 210, the position selector 404, etc. of FIGS. 2 and 3) to the first processor 104 of the vehicle 102. The request receiver 600 detects whether the calendar event data includes a request for the vehicle 102 in connection with the event. In some examples, the request receiver 600 receives updated calendar event data for a previously scheduled calendar event that is modified by a user of the user application 120 to include, for example, a request for the vehicle 102.

The vehicle requests and related calendar event data received by the request receiver 600 are stored in a database 602. The database 602 stores vehicle requests and related calendar event data for requests received via the user application 120 of the first, second, and third mobile devices 106, 108, 110. The database 602 also stores data such as predefined priority rules entered by the first, second, and/or third user via the user application 120. The database 602 also stores user preferences with respect to vehicle settings, such as heat settings or radio presets. Thus, the database 602 stores data received by the scheduler 134 from the users of the vehicle 102.

The database 602 also includes a vehicle calendar 603. The vehicle calendar 603 stores vehicle requests for the vehicle 102 to create a schedule for the vehicle 102. The data stored in the vehicle calendar 603 regarding the schedule of the vehicle 102 can be viewed via, for example, the fourth example screen 500 of the user application 120, which displays the calendar events created by the users of the first, second, and third mobile devices 106, 108, 110.

The scheduler 134 includes a conflict analyzer 604. Upon receipt of a new vehicle request, the conflict analyzer 604 analyzes the calendar data associated with the new vehicle request and compares the calendar data for the new vehicle request with previously stored calendar data. The conflict analyzer 604 determines whether there is a conflict between the new vehicle request and previously scheduled vehicle requests stored in the database 602 and the vehicle calendar 603. For example, the conflict analyzer 604 compares the calendar event data such as start and end times and location associated with the new vehicle request to calendar event data associated with previously scheduled vehicle requests for the same day as the new vehicle request. In some examples, the conflict analyzer 604 compares the new vehicle request data to previously scheduled requests within a threshold time period before and/or after the start or end times of the calendar event for the new vehicle request.

The conflict analyzer 604 determines if there are any direct conflicts between the new vehicle request and previously scheduled vehicle requests, such as, for example, a vehicle request scheduled for the same day and time as the new vehicle request. In other examples, the conflict analyzer 604 determines that there is a direct conflict if one or more previously scheduled vehicle requests overlap with the start and/or end times of the new vehicle request. In determining whether there is a direct conflict between the new vehicle request and the previously scheduled vehicle request(s), the conflict analyzer 604 accounts for the rules created via the rules creator 128 of the user application 120, including default rules and/or calendar-event specific rules (e.g., created via the priority rules menu 216 of the first and second example screens 200, 300 of FIGS. 2 and 3). For example, if the calendar event associated with the new vehicle request is marked as a high priority event or if the user who created the calendar event for the new vehicle request is associated with a default rule that prioritizes the user's calendar event over other calendar events, then other previously scheduled events for the same time as the new vehicle request may be identified as a conflict with the new vehicle request.

If the conflict analyzer 604 determines that there is a direct conflict between the new vehicle request and one or more previously scheduled events, the conflict analyzer 604 communicates with a request confirmer 606 of the scheduler 134 to inform the request confirmer 606 of the conflict. The request confirmer 606 generates one or more conflict alerts to be transmitted to the mobile device of the user who created the new vehicle request and/or the mobile device(s) of the user(s) who created the previously scheduled vehicle requests. For example, if the new vehicle request created by the first user via the first mobile device 106 is in direct conflict with a previously schedule vehicle request created by the second user via the second mobile device 108, the request confirmer 606 sends an alert to the user application 120 of the first mobile device 106 that the vehicle request is denied. In response to the alert, the user application 120 populates the vehicle arrival time field 212 with an indicator that the vehicle 102 is not available (e.g., via an "X" in the vehicle arrival time field 212).

As disclosed above, in some examples, the new vehicle request created by the first user via the first mobile device 106 may be associated with a high priority event. In such examples, the request confirmer 606 transmits an alert to the second mobile device 108 to inform the second user that there is now a conflict with the second user's previously scheduled vehicle request. For example, the user application 120 of the second mobile device 108 can update the vehicle arrival time field 212 for the previously scheduled vehicle request (e.g., based on a vehicle arrival time received from the scheduler 134) and generate a notification for viewing by the second user. In other examples, the request confirmer 606 sends alerts to the first mobile device 106 and the second mobile device 108 if the vehicle arrival time field 212 is updated for each request to accommodate both requests based on data received from the scheduler 134).

The scheduler 134 also analyzes the calendar event data to determine whether there are any indirect conflicts with previously scheduled vehicle request(s), or scheduling conflicts that are not caused by an overlap of event times, but may still prevent the vehicle 102 from being able to meet the new vehicle request or a previously scheduled vehicle request. For example, although a new vehicle request may not overlap with a previously scheduled vehicle request, the vehicle 102 may not be able to reach the location of the calendar event associated with the new vehicle request at the requested time in view of a location of the vehicle 102 when fulfilling a previously scheduled vehicle request preceding the new vehicle request. In determining whether there are any indirect conflicts, the scheduler 134 determines a route of the vehicle 102 to reach the location of the calendar event and travel times of the vehicle 102 to reach the location.

The scheduler 134 includes a trip planner 608. The trip planner 608 analyzes the calendar event data and calculates an arrival time for the vehicle 102 to reach a location associated with the new vehicle request (e.g., an intended location such a starting location or the calendar event location). In some examples, the trip planner 608 calculates the arrival time for the vehicle 102 to reach a location of the user to pick up and drive the user to the location of the calendar event. In other examples, the trip planner 608 calculates the arrival time for the vehicle 102 to reach the location of the calendar event to pick up the user from the calendar event. Also, the trip planner 608 provides a map of the location (e.g., the map 402 of the third example screen 500) for display via the GUIs 122 of the mobile devices 106, 108, 110 and to enable selection of the pickup position at the location (e.g., via the position selector 404 of the third example screen 500).

In calculating the arrival time of the vehicle 102, the trip planner 608 generates one or more routes of the vehicle 102 to reach the intended location. The trip planner 608 receives vehicle location data from a vehicle locator 610 of the scheduler 134. Upon receiving a new vehicle request via the request receiver 600, the vehicle locator 610 determines a current location of the vehicle 102 or an expected location of the vehicle 102 at a time preceding the calendar event with which the new vehicle request is associated. The vehicle locator 610 determines the current or expected location of the vehicle 102 using, for example, GPS information or location data for a previously scheduled calendar event preceding the calendar event for the new vehicle request (e.g., location data stored in the database 602).

The trip planner 608 determines one or more routes of the vehicle 102 to reach the location of the new vehicle request based on the current or expected location of the vehicle 102 as determined by the vehicle locator 610. For example, the trip planner 608 uses GPS information, navigation tools (e.g., mapping applications installed in the vehicle 102 as part of the infotainment services), and/or routes previously taken by the vehicle 102 that are stored in the database 602, to determine the route(s) of the vehicle 102 from the current or expected location of the vehicle 102 to the location of the new vehicle request. In some examples, the trip planner 608 selects a route from two or more available routes based on, for example, shortest distance, traffic delays, construction, etc.

The trip planner 608 calculates the estimated travel time for the vehicle 102 to reach the intended location based on the selected route and determines an arrival time of the vehicle at the location (e.g., at the pickup position at the location). To calculate the arrival time, the trip planner 608 accounts for the scheduled start and/or event time of the calendar event associated with the new vehicle request, the estimated travel time of the vehicle 102, the arrival buffer time for the arrival of the vehicle 102 in advance of the scheduled start and/or end time (e.g., as input by the user via the arrival buffer field 210 of the first example screen 200), and any extra preparation time, or time required to implement one or more vehicle settings (e.g., a time for the vehicle 102 to heat up based on the vehicle settings input by the user). For example, the first user requests can request to be picked up by the vehicle 102 at a calendar event 102 ending at 11:00 AM with an arrival buffer of five minutes and the heat on the vehicle 102 to warm an interior of the vehicle 102 to 72° degrees. The trip planner 108 estimates that it will take 30 minutes for the vehicle 102 to arrive at the destination. Based on the scheduled event time, the estimated travel time, the arrival buffer time, and the extra preparation time (e.g., to warm the vehicle), the trip planner 108 determines that vehicle 102 will arrive at 10:55 am to account for the arrival buffer time and should travel to the location at 10:20 to account for the travel time and the preparation time to warm the vehicle.

The conflict analyzer 604 analyzes the arrival time of the vehicle 102 at the location for the new vehicle request to previously scheduled vehicle requests preceding or following the new vehicle requests. If there are no conflicts between the arrival time of the vehicle 102 at the location for the new vehicle request and the previously scheduled requests, the request confirmer 606 transmits the arrival time to the user application 120. The user application 120 populates the vehicle arrival time field 212 with the arrival time. The first user can confirm or accept the vehicle request with the arrival time via the confirmation buttons 222, 310 of the first and second example screens 200, 300 of FIGS. 2 and 3.

If the conflict analyzer 604 determines that the vehicle 102 will not be able to arrive at the intended location at by the scheduled start time, end time, or arrival buffer time for the calendar event (or within a predetermined threshold of the start time, end time, or arrival buffer time) due to, for example, the estimated travel time of the vehicle 102 to reach the location, the conflict analyzer 604 identifies the new vehicle request as a conflict in view of one or more previously scheduled events. The conflict analyzer 604 communicates with the request confirmer 606 of the scheduler 134 to inform the request confirmer 606 of the conflict. The request confirmer 606 transmits an alert to the user application 120 of the mobile device of the user who created the new vehicle request and/or the mobile device(s) of the user(s) who created the previously scheduled vehicle request(s).

In some examples, the conflict analyzer 604 identifies the new vehicle request as being a conflict if the vehicle 102 will not be able to meet an arrival time for a vehicle request following the new vehicle request. For example, the conflict analyzer 604 compares an expected location of the vehicle 102 if the vehicle 102 was to fulfill the new vehicle request to the location and scheduled arrival time of the previously scheduled event. In some examples, the vehicle 102 may not be able to arrive at the location of the previously scheduled event on time due to, for example, the new vehicle request requiring the vehicle 102 to travel to a location that increases the estimated travel time for the vehicle 102 to reach the location of the previously scheduled calendar event (e.g., a calculated by the trip planner 608). In such examples, the conflict analyzer 604 identifies the new vehicle request as a conflict due to the effect on the previously schedule vehicle request.

In other examples, the conflict analyzer 604 identifies one or more previously scheduled events preceding and/or following the new vehicle request as a conflict. For example, the calendar event associated with the new vehicle request can be assigned a high event priority. If the vehicle 102 is not able to meet the arrival time for the new vehicle request due to, for example, the estimated travel time from the location associated with the previously scheduled calendar event (e.g., as calculated by the trip planner 608), the conflict analyzer 604 identifies the previously scheduled vehicle request as a conflict in view of the priority assigned to the new vehicle request.

As disclosed above, in examples where there is a conflict between the new vehicle request and one or more previously scheduled vehicle requests, the conflict analyzer 604 communicates the conflict to the request confirmer 606. The request confirmer 606 transmits an alert to the user application 120 associated with the mobile device(s) of the user who created the new vehicle request and/or the user(s) who created the previously scheduled vehicle request(s). Based on the alert from the request confirmer 606, the user application 120 populates the vehicle arrival time field 212 of the first example screen 200 of FIG. 2 of, for example, the GUI 122 where the new vehicle request was generated with an indicator that the vehicle 102 is not available. In some examples, the request confirmer 606 sends the user an adjusted arrival time for the vehicle 102 based on a next time that the vehicle 102 is available as determined by the scheduler 134 in view of the vehicle schedule stored in the vehicle calendar 603 and the analysis performed by the conflict analyzer 604, the trip planner 608, and the vehicle locator 610. In such examples, the user application 120 populates the vehicle arrival time field 212 of the first example screen 200 with a proposed or alternative time.

Upon viewing the indicator that the vehicle 102 is not available or the proposed alternative time, the user(s) can settle the conflict by, for example, rescheduling the calendar event(s) associated with the vehicle request(s) for a different day and/or time or accepting the proposed alternative time. Upon receiving the revised calendar event data and vehicle request(s) as modified by the user(s) via the mobile devices 106, 108, 110 via the request receiver 600, the scheduler 134 determines whether there are any conflicts with the rescheduled vehicle requests (e.g., based on the arrival times calculated by the trip planner 608 using the revised calendar event data).

In some examples, the scheduler 134 proposes shared use of the vehicle 102 for two or more calendar events to settle the conflict between vehicle requests. The scheduler 134 can also proposed shared rides, or grouping two or more calendar events with associated vehicle requests, if there is no conflict between the vehicle requests. For example, the scheduler 134 can identify opportunities for shared rides to maximize an efficiency of the use of the vehicle 102 and/or for environmental purposes. In some examples, the scheduler 134 designates certain time slots as limited to ridesharing (e.g., time slots pre-set by the user), such as 3 pm to 6 pm on weekdays.

To identify opportunities for shared rides, a rideshare analyzer 612 of the scheduler 134 analyzes the calendar event data (e.g., location, start and/or end times) associated with the new calendar event and the previously scheduled events to determine whether any of the vehicle requests can be grouped together as a shared ride. If two or more vehicle requests can be grouped together, the rideshare analyzer 612 communicates with the request confirmer 606 to present a rideshare proposal to the users who created the vehicle requests that can be grouped via the mobile devices 106, 108, 110. In some example, the rideshare proposal is display via the rideshare details field 304 of the second example screen 300 of FIG. 3 of the respective GUIs 122 of the mobile devices.

For example, the vehicle locator 610 may determine that a location of a calendar event for a previously scheduled vehicle request preceding the new vehicle request may be proximate to a location of the calendar event for the new vehicle request and/or that the route to each location at least partially overlaps. In such examples, the rideshare analyzer 612 identifies the previously scheduled vehicle request and the new vehicle request as a potential shared ride. Based on the routes and estimated travel times determined by the trip planner 608 for the new vehicle request and the previously scheduled vehicle request, the rideshare analyzer 612 determines a route for the vehicle 102 to reach the respective locations of the previously scheduled vehicle request and the new vehicle request as a trip including multiple legs. The rideshare analyzer 612 also calculates an arrival time at each location based on the route. In some examples, arrival times for each location meet the originally requested arrival times for each vehicle request. In other examples, the rideshare analyzer 612 proposes a new arrival time for one or more of the events if the new arrival time is within a threshold time frame of the originally requested arrival time for the vehicle (e.g., within a half an hour of the originally requested arrival time).

Referring to the first user of the first mobile device 106 and the second user of the second mobile device 108 as an example, the rideshare analyzer 612 can propose, for example, retrieving the first and second users from a starting location and driving the first and second users to their respective locations or retrieving the first or second user from a first location and the retrieving the other of the first or second user from a second location while the user retrieved from the first location is still in the vehicle 102. The request confirmer 606 transmits the proposed shared ride, including the proposed arrival times for each leg of the trip, to the user applications 120 of the first and second mobile devices 106, 108 for display via the rideshare details field 304 of the second example screen 300 of FIG. 3. If the first and/or second users accept the proposed shared ride (e.g., via respective confirmation buttons 310), the calendar events associated with each vehicle request are automatically displayed as a grouped event via the user applications 120 of the mobile devices 106, 108, 110 (e.g., the grouped event 508 of the fourth example screen 500 of FIG. 5).

Thus, the scheduler 134 provides for automatic evaluation and adjustment of vehicle requests based on the schedule of the vehicle 102. If the scheduler 134 identifies one or more conflicts, the scheduler 134 alerts the user application 120 to the conflict and, in some examples, selectively adjusts the arrival times and/or routes of the vehicle 102 to accommodate multiple vehicle requests (e.g., by proposing shared rides). The scheduler 134 provides for dynamic management of vehicle requests by automatically scheduling the requests without requiring the users to access a separate user application for the vehicle or requiring the users to manually manage the schedule of the vehicle 102.

If there are no conflicts with the new vehicle request and previously scheduled requests and/or if the conflicts are resolved (e.g., via rescheduling, acceptance of an adjusted arrival time, or acceptance of a shared ride) and the user(s) accept the arrival time of the vehicle 102 (e.g., via the confirmation buttons 222, 310 of the first and second example screens 200, 300 of FIGS. 2 and 3), the request confirmer 606 adds the new vehicle request to the vehicle calendar 603 of the database 602. After the new vehicle request has been added to the vehicle calendar 603, the scheduler 134 directs the vehicle 102 to fulfill the request at the scheduled time.

The scheduler 134 includes a vehicle controller 614 to direct the vehicle 102 to fulfill one or more vehicle requests based on the schedule of the vehicle as stored in the vehicle calendar 603. The vehicle controller 614 monitors the vehicle calendar 603. The vehicle controller 614 directs the vehicle 102 with respect to parameters of a vehicle request when the vehicle request is ready to be fulfilled by sending one or more instructions to the vehicle 102. For example, the vehicle controller 614 directs the vehicle 102 along the route to reach the location of the calendar event associated with the vehicle request and the pickup position at the location (e.g., as selected by the user via the position selector 404 of the second example screen 400 of FIG. 4). The vehicle controller 614 also instructs the vehicle 102 to implement the vehicle settings input by the user with respect to, for example, heating the vehicle 102. Thus, the vehicle controller 614 instructs the vehicle 102 with respect to execution of the vehicle request.

Data associated with the vehicle requests executed by the vehicle 102 such as locations and routes are stored in the database 602. The scheduler 134 includes a historical trip tracker 616 to analyze the vehicle request data and calendar event data and detect patterns in the data. For example, the historical trip tracker 616 may identify user-specific vehicle usage patterns, such as requests for the vehicle 102 for a calendar event occurring weekly at the time same. The historical trip tracker 616 identifies patterns with respect to the user's preferred arrival buffer time for the vehicle 102. The historical trip tracker 616 also identifies patterns with respect to routes taken by the vehicle 102. For example, the historical trip tracker 616 identifies that the vehicle 102 drives the same route to a location twice a week.

In addition to managing requests generated by the first, second, and/or third users of the first, second, and third mobile devices 106, 108, 110, the scheduler 134 predicts vehicle requests based on the analysis of the vehicle usage and calendar event data performed by the historical trip tracker 616. The scheduler 134 includes a predictor 618. As an example, when the first user creates a new calendar event that is received by the request receiver 600, the predictor 618 identifies that the new calendar event is associated with a location to which the vehicle 102 has previously driven based on the data analysis performed by the historical trip tracker 616. Also, upon receipt of the calendar event, the trip planner 608 can automatically determine a route to the location of the calendar event based on current or expected vehicle location data detected by the vehicle locator 610 to identify whether the vehicle 102 has previously driven the route.

If the predictor 618 determines that the vehicle 102 has previously driven to the location of the new calendar event and/or previously taken the route determined by the trip planner 608, the predictor 618 predicts that the first user will need the vehicle 102 for the calendar event. The predictor 618 communicates with the request confirmer 606 to send a prompt to the user application 120 of the first mobile device 106 to ask the first user if the first user wants to request the vehicle 102 for the calendar event. In some examples, the prompt includes instructing the user application 120 to automatically pre-select the vehicle request field 208. In other examples, the prompt instructs the user application 120 to display a new window (e.g., a pop-up window via the first example screen 200 of FIG. 2) asking the first user if he would like to request the vehicle 102. In some examples, the prompt instructs the user application 120 to auto-populate the arrival buffer field 210 based on the patterns in arrival buffer times input by the first user as analyzed by the historical trip tracker 616. In some examples, the predictor 618 directs the request confirmer 606 to send the prompt if the conflict analyzer 604 determines that there would be no conflicts with a vehicle request for the new calendar event.

In other examples, the predictor 618 predicts that the first user will create a calendar event that includes a vehicle request based on the analysis performed by the historical trip tracker 616. For example, the historical trip tracker 616 can detect that the first user schedules an event for the third Tuesday of every month a particular location. The predictor 618 can predict that the first user will schedule an event on the third Tuesday of upcoming months to the location. The predictor 618 can direct the request confirmer 606 to send a prompt to the user application 120 to auto-generate calendar entries for the third Tuesday of every month to the location and including a request for the vehicle 102.

If the first user confirms that the vehicle 102 should be requested for the calendar event and/or if the first user confirms the auto-generated calendar events, the user application 120 prompts the user to select the pickup position at the location (e.g., via the position selector 404 of the fourth example screen 500). Also, the scheduler 134 schedules the request in the vehicle calendar 603 substantially as disclosed above. Thus, the scheduler 134 manages user-generated requests and also predicts user needs for the vehicle 102 based on a historical data analysis to auto-generate vehicle requests.

While an example manner of implementing the example system 100 is illustrated in FIGS. 1-6, one or more of the elements, processes and/or devices illustrated in FIGS. 1-6 may be combined, divided, re-arranged, omitted, eliminated and/or implemented in any other way. Further, the example first processor 104, the first mobile device 106, the second mobile device 108, the third mobile device 110, the second processor 118 of each of the first, second, and third mobile devices 106, 108, 110, the user application 120 (including the calendar 124, the location selector 126, the rules creator 128, the database 130, the communicator 132, and the scheduler 134 (including the request receiver 600, the database 602, the vehicle calendar 603, the conflict analyzer 604, the request confirmer 606, the trip planner 608, the vehicle locator 610, the rideshare analyzer 612, the vehicle controller 614, the historical trip tracker 616, and the predictor 618) and/or, more generally, the example system 100 may be implemented by hardware, software, firmware and/or any combination of hardware, software and/or firmware. Thus, any of the example first processor 104, the first mobile device 106, the second mobile device 108, the third mobile device 110, the second processor 118 of each of the first, second, and third mobile devices 106, 108, 110, the user application 120 (including the calendar 124, the location selector 126, the rules creator 128, the database 130, the communicator 132, and the scheduler 134 (including the request receiver 600, the database 602, the vehicle calendar 603, the conflict analyzer 604, the request confirmer 606, the trip planner 608, the vehicle locator 610, the rideshare analyzer 612, the vehicle controller 614, the historical trip tracker 616, and the predictor 618) and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first processor 104, the first mobile device 106, the second mobile device 108, the third mobile device 110, the second processor 118 of each of the first, second, and third mobile devices 106, 108, 110, the user application 120 (including the calendar 124, the location selector 126, the rules creator 128, the database 130, the communicator 132, and the scheduler 134 (including the request receiver 600, the database 602, the vehicle calendar 603, the conflict analyzer 604, the request confirmer 606, the trip planner 608, the vehicle locator 610, the rideshare analyzer 612, the vehicle controller 614, the historical trip tracker 616, and the predictor 618) and/or, more generally, the example system 100 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIGS. 1-6 may include one or more elements, processes and/or devices in addition to, or instead of, those illustrated in FIGS. 1-6, and/or may include more than one of any or all of the illustrated elements, processes and devices.

Figure 7:
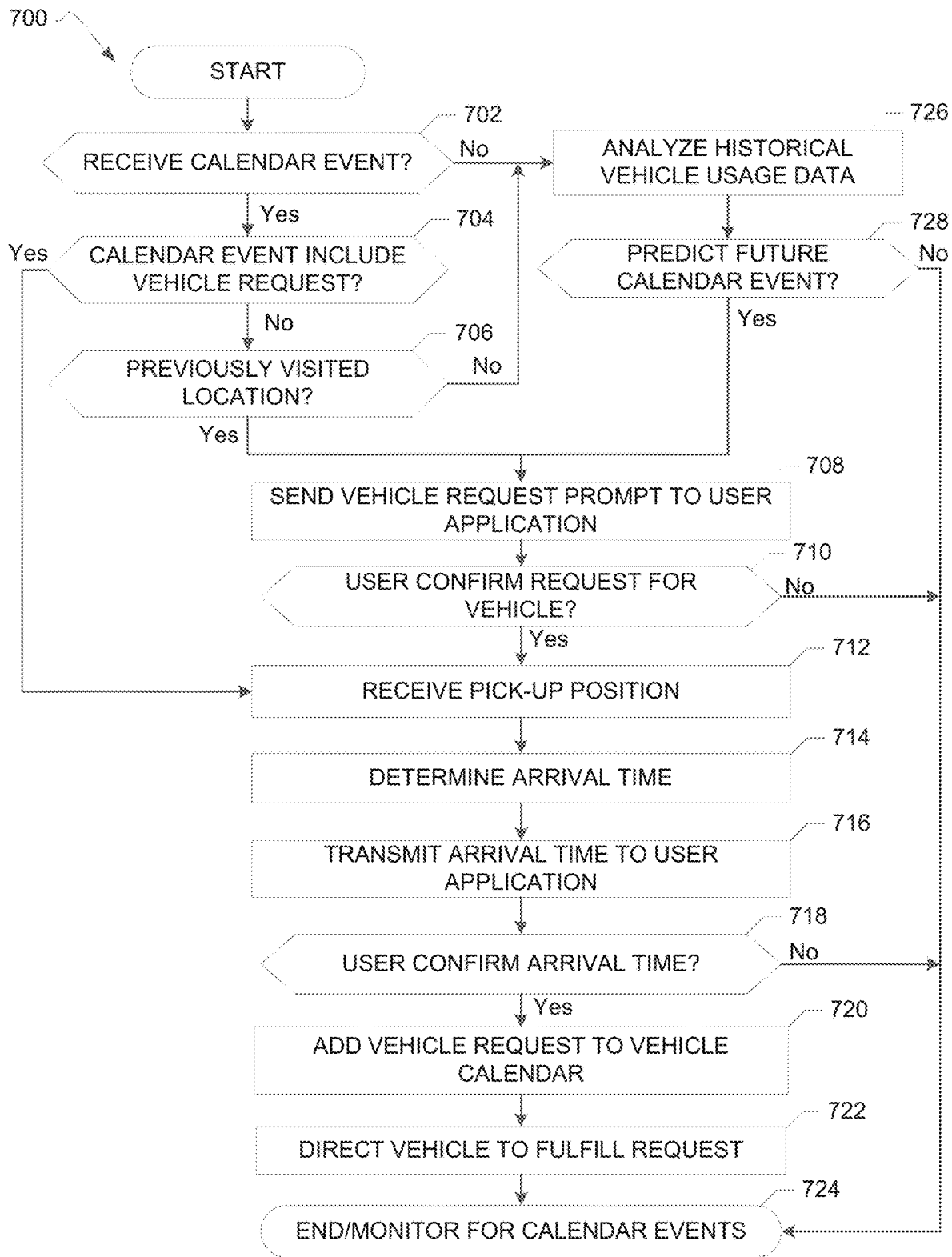
FIG. 7 is a flow diagram of a first method that may be executed to implement the example system of FIG. 1.

FIG. 7 illustrates a flowchart representative of an example method 700 that can be implemented to automatically schedule an autonomous vehicle via a calendar user application and a schedule manager of the vehicle. The example method 700 can be implemented using the scheduler 134 of the vehicle 102 and the user application 120 of the respective mobile devices 106, 108, 110 of FIGS. 1-6. The example method 700 begins with determining whether a calendar event has been received (block 702). A calendar event can be created by a user via the calendar 124 of the user application 120 of the first, second, or third mobile device 106, 108, 110 and transmitted to the first processor 104 of the vehicle 102 via the communicator 132 of the user application 120 of FIGS. 1-5. The user creates the calendar event via the first, second, third, and fourth example screens 200, 300, 400, 500 of FIGS. 2-5 by providing inputs to, for example, the event time fields 204 and the location field 206. The determination of whether a calendar event has been received can be performed by the request receiver 600 of the scheduler 134 of FIGS. 1 and 6.

If a calendar event has been received, the example method 700 includes determining whether the calendar event includes a request for use of an autonomous vehicle (e.g., the vehicle 102) in connection with the event (block 704). A user can request the vehicle via the GUI 122 of the one of the mobile devices 106, 108, 110, such as via the vehicle request field 208 of the first example screen 200 of FIG. 2. The request receiver 600 of FIG. 6 can detect whether the calendar event includes a request for use of a vehicle. The data received from the calendar event (e.g., location) can be stored in the database 602.

If the calendar event does not include a request for the vehicle, the example method 700 includes determining whether the location associated with the vehicle request is a location to which the vehicle has previously driven (block 706). For example, the trip planner 608 of the scheduler 134 can search data stored in the database 602 for previous vehicle requests to determine whether the vehicle has driven to the location of the calendar event.

If a determination is made that the vehicle has previously visited the location, but the calendar event does not include a request for the vehicle, the example method 700 includes automatically sending a vehicle request prompt to the user application of the mobile device where the calendar event was created (block 708). In some examples, the request confirmer 606 sends a prompt to the user application 120 instructing the user application to automatically select the vehicle request field 208 of the first example screen 200 of FIG. 2 based on the determination that the vehicle was previously used to reach the location of the calendar event. In other examples, the user application 120 presents a pop-up window asking the user if he would like to request the vehicle for the event.

The example method 700 incudes a determination of whether the user has confirmed that the vehicle should be requested for the calendar event vehicle request via the user application (block 710). For example, the user can confirm the vehicle request for the calendar event via the user application 120 by selecting the confirmation button 222 of the first example screen 200 with the vehicle request field 208 selected. If the user does not confirm the request (e.g., the user de-selects the vehicle request field 208), the example method 700 determines that the user does not want to request a vehicle for the calendar event and the example method 700 ends with continued monitoring for the receipt of calendar events and/or vehicle requests (block 724).

If the user confirms that the vehicle should be requested for the calendar event or if calendar event includes a vehicle request input by the user at the time of creation of the calendar event (e.g., block 704), the example method 700 continues with receipt of the pickup position of the user at the location (block 712). For example, the user of the user application 120 selects a pickup position at the location of the vehicle request via the location selector 126 of the user application 120, which can include the map 402 and the position selector 404 of the second example screen 300 of FIG. 3.

The example method 700 includes determining an arrival time of the vehicle at the location based on the calendar event data such as the location of the vehicle request, the requested arrival time (e.g., start time, end time, and/or arrival buffer time), and/or any other user inputs such as vehicle settings associated with the vehicle request (block 714). For example, the trip planner 608 determines a route of the vehicle to reach the location based on the calendar event data and a current or expected location of the vehicle (e.g., based on location data from the vehicle locator 610). The trip planner 608 estimates the travel time based on the route. The trip planner 608 determines the arrival time based on the event time, the travel time, the arrival buffer time as requested by the user, and/or any additional time required to implement the vehicle settings (e.g., to heat the vehicle as requested by the user).

The example method 700 includes transmitting the arrival time to the user application (block 716). For example, the request confirmer 606 transmits the arrival time to the user application 120 for display via the vehicle arrival time field 212. The example method 700 includes a determination of whether the user has confirmed or accepted the arrival time of the vehicle (block 718). For example, the user can accept the arrival time of the vehicle via the confirmation buttons 222, 310 of the first and second example screens 200, 300 of FIGS. 2 and 3 to save the calendar event with the vehicle request at the arrival time. If the user does not accept the arrival time, the example method 700 determines that the user does no longer wishes to request the vehicle due and the example method 700 ends with continued monitoring of calendar ends (block 724).

If the user confirms the arrival time of the vehicle, the example method 700 includes adding the vehicle request to a calendar for the vehicle (block 720). For example, the vehicle request can be added to the vehicle calendar 603 of the scheduler 134 with data regarding the arrival time, location, route, user preferences, etc. for the vehicle request. The example method 700 includes directing the vehicle to fulfill the request at the scheduled time (block 722). For example, the vehicle controller 614 of the scheduler 134 can send one or more instructions or commands to the vehicle to direct the vehicle to arrive at a location at the scheduled time. The example method 700 ends with continued monitoring of calendar events created via, for example, the user application 120 and received by the scheduler 134 of the vehicle (block 724).

The example method 700 also provides for predicting vehicle requests. As disclosed above, if a calendar event does not include a vehicle request, the example method 700 includes determining whether a request should be generated based on whether the vehicle has previously driven to a location associated with the calendar event (e.g., blocks 704-710). The example method 700 can also determine whether a vehicle request should be generated if no calendar event is received as part of a predictive analysis of vehicle usage data.

For example, if the scheduler of the vehicle has not received a calendar event (e.g., at block 702), the example method 700 includes analyzing historical vehicle usage data to determine whether the vehicle is likely to be used for a future, yet unscheduled calendar event (block 726). As disclosed above, the historical trip tracker 616 of the scheduler 134 analyzes data for previous vehicle requests to identify patterns in vehicle usage. For example, the historical trip tracker 616 detects that the user schedules a calendar event to a location once a month and requests a vehicle in connection with the calendar event.

Based on the analysis of the historical usage data, the example method 700 includes predicting whether or not there is an upcoming calendar event (block 728). For example, if the historical trip tracker 616 detects one or more patterns with respect to calendar events for a location created by the user, the predictor 618 of the scheduler 134 can predict that the user will create a new calendar event for the location and request the vehicle in connection with the calendar event. If a future calendar event is predicted, the example method 700 includes sending a vehicle request prompt to the user application (block 708). In some examples, the vehicle request prompt is a prompt to auto-generate a future calendar event via the user application that includes the vehicle request based on the prediction of the future calendar event. The example method 700 continues with determining whether the user confirms the predictively generated vehicle request (e.g., block 710).

The prediction of future calendar events and vehicle requests can be performed as the scheduler of the vehicle receives, processes, and stores calendar event and vehicle request data. For example, if a determination is made that a calendar event does not include a vehicle request and that the calendar event is not associated with a location that the vehicle has previously visited (e.g., blocks 704, 706), the example method 700 determines that the user does not want to request a vehicle for the calendar event. In such examples, the example method 700 can continue with analysis of the historical vehicle usage data (block 726) to predict whether there are other future calendar events for which the user may request the vehicle and to provide prompts of auto-generation of such requests. Thus, the example method 700 provides for intelligent, efficient scheduling of vehicle requests that can minimize the need for user inputs of calendar events via the predictive analysis.

The example method 700 of FIG. 7 provides for scheduling use of a vehicle via a vehicle request that is created via a user application (e.g., the user application 120 of FIGS. 1-5) and processed by a scheduler manager (e.g., the scheduler 134 of FIGS. 1 and 6). In some examples, two or more users access the user application to generate calendar events via respective user devices such as the mobile devices 106, 108, 110. Multiple requests for the vehicle in connection with the calendar events created by each user can result in scheduling conflicts with respect to availability of the vehicle.

Figure 8:
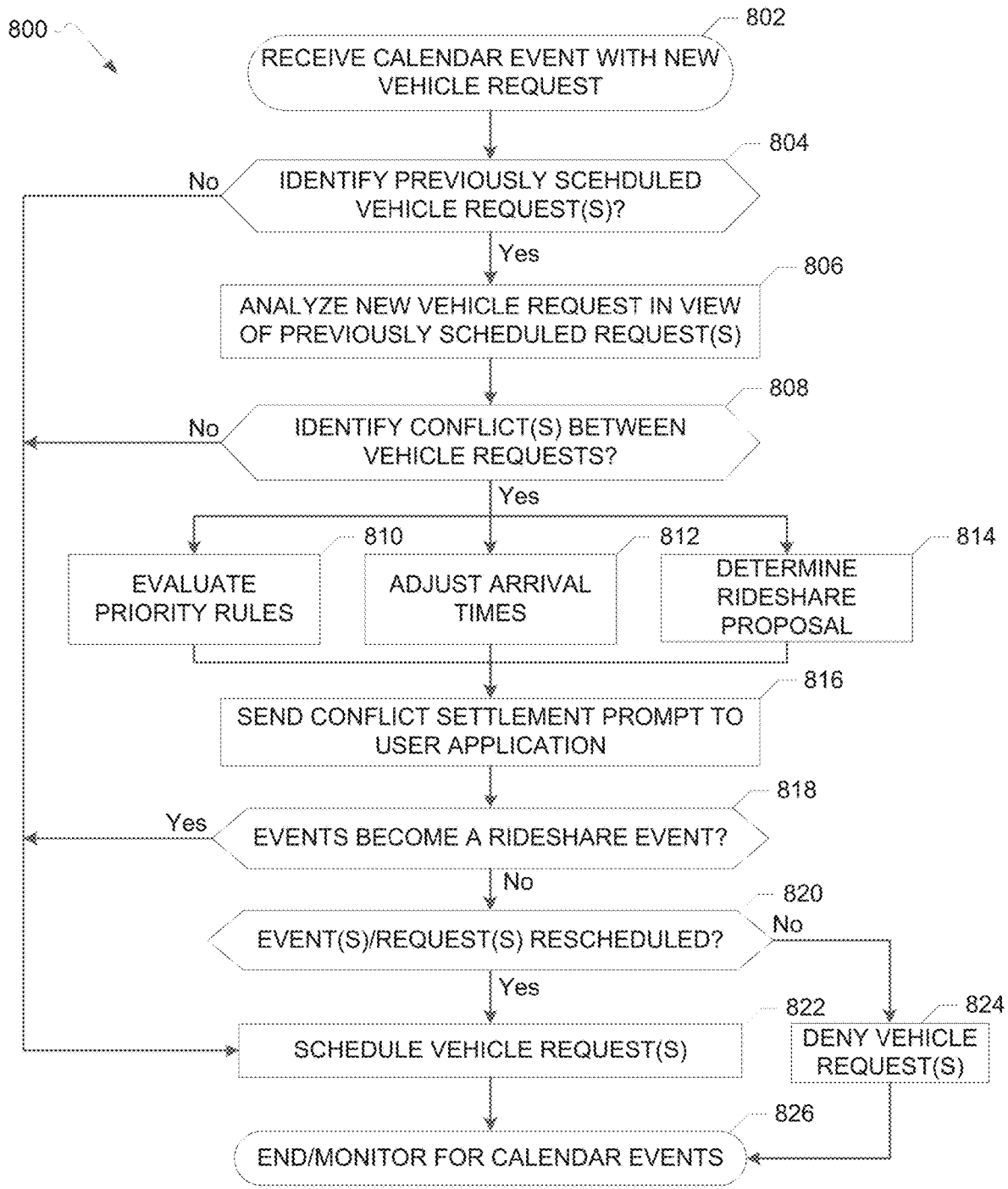
FIG. 8 is a flow diagram of a second example method that may be executed to implement the example system of FIG. 1.

FIG. 8 illustrates a flowchart representative of an example method 800 that can be implemented to address vehicle scheduling conflicts. The example method 800 can be implemented using the scheduler 134 of the vehicle 102 and the user application 120 of the respective mobile devices 106, 108, 110 of FIGS. 1-6.

The example method 800 includes receiving a calendar event including a request for the vehicle (block 802). The calendar event can be received by the scheduler 134 of the vehicle 102 substantially as disclosed above in connection with FIGS. 1-7. Upon receipt of the calendar event with the new vehicle request, the example method 800 includes determining whether one or more requests for the vehicle have been previously scheduled (block 804). For example, the conflict analyzer 604 of the scheduler 134 can determine whether there other previously scheduled vehicle requests based on data stored in the vehicle calendar 603. If there are no previously scheduled events, the example method 800 includes scheduling the new vehicle request substantially as disclosed above in connection with FIGS. 1-7 (block 822).

If there is one or more previously scheduled events, the example method 800 includes analyzing the new vehicle request in view of the previously scheduled vehicle requests (block 806). For example, based on the calendar event data associated with the new vehicle request, the trip planner 608 can determine a route to reach the location of the calendar event and estimate an arrival time. The conflict analyzer 604 can compare the arrival time for the new request in view of arrival times calculated for the previously scheduled vehicle request(s). The conflict analyzer 604 can analyze data such as location, start and end times, arrival buffer times, priority rules assigned to the calendar events associated with the vehicle requests, etc. associated with the new vehicle request and the previously scheduled vehicle requests to determine if there are conflicts between the new vehicle requests.

The example method 800 includes a determination of whether there are one or more conflicts between the new vehicle request and the previously scheduled vehicle request(s) that would prevent the vehicle from completing each request (block 808). For example, the conflict analyzer 604 may determine that the vehicle will not be able to arrive at a previously scheduled vehicle request by the scheduled arrival time if the vehicle fulfills the new vehicle request before the previously scheduled vehicle request. In such examples, the conflict analyzer 604 identifies a conflict between the requests. If there are no conflicts identified between the vehicle requests, the example method 800 includes scheduling the new vehicle request substantially as disclosed above in connection with FIGS. 1-7 (block 822).

If one or more conflicts are identified between the vehicle requests, the example method 800 includes evaluating one or more rules or options to resolve the conflict(s). The example method 800 includes evaluating priority rules that may be assigned to one or more of the calendar events associated with the vehicle requests (block 810). For example, the calendar event associated with the new vehicle request may have been assigned a high priority level by a user who created the calendar event via the user application 120. The conflict analyzer 604 determines an ability of the vehicle requests to be rescheduled based on the priority rules associated with the request(s).

The example method 800 includes adjusting the arrival times of the new vehicle request and the request(s) in conflict with the new vehicle requests (block 812). For example, the conflict analyzer 604, the trip planner 608, the vehicle locator 610 can determine whether the vehicle is available to fulfill the new vehicle request and/or the previously scheduled request(s) at other times than requested. The trip planner 608 can determine adjusted arrival times of the vehicle at the locations associated with the requests based on the alternative availability of the vehicle.

The example method 800 also includes determining a rideshare proposal (block 814). In some examples, the rideshare analyzer 612 scheduler 134 identifies one or more shared characteristics or overlaps between the locations, the routes to the locations, the start and ends times of the calendar events in conflict, etc. In such examples, the rideshare analyzer 612 determines a shared route for the locations such that the vehicle fulfills the requests during one trip with multiple legs. The rideshare analyzer 612 can develop a ridesharing proposal based on the determination that the requests can be grouped together.

In view of identification of the conflict(s) between the vehicle requests and the evaluation of priority rules, adjustment of arrival times, and determination of a rideshare proposal, the example method 800 continues with sending a conflict settlement prompt to the user application (block 816). In some examples, the request confirmer 606 sends a prompt to the user application 120 to alert the user(s) who created the requests in conflict of the scheduling conflict between the requests. The request confirmer 606 can also send the adjusted arrival times or ridesharing proposal to the user application 120 for display via the vehicle arrival time field 212 and/or the rideshare details field 304 of the first and second example screens 200, 300 of FIGS. 2 and 3. In some examples, the request confirmer 606 sends the alert to adjust the arrival times or propose ridesharing based on the identification of the priority rules associated with the calendar events for the vehicle requests.

The user application associated with the user devices used to generate the vehicle request displays the conflict settlement prompt(s) to alert the user(s) of conflicts between vehicles requests, changes in the arrival times of the vehicle, ridesharing options, etc. In response, the users can provide inputs to the user application to confirm or reject the conflict settlement prompts. For example, a user can reject an adjustment to the vehicle arrival time by cancelling the calendar event via the cancel button 224 of the first example screen 200 of FIG. 2.

The example method 800 includes determining whether the user(s) have accepted the proposed changes to the vehicle request(s). The example method 800 includes a determination of whether two or more of the calendar events associated with the vehicle requests in conflict have become rideshared events (block 818). If the events have become rideshared events, the example method 800 schedules the vehicle requests (block 822). For example, the rideshare analyzer 612 can save the requests to the vehicle calendar 603 as a grouped request or event with the shared route information.

If the calendar events associated with the vehicle requests in conflict do not become rideshared events, the example method 800 includes a determination if one or more of the calendar events and/or vehicle requests have been rescheduled (block 820). For example, if the user who created the new vehicle requests accepts the adjusted arrival time for the vehicle, the example method 800 continues with scheduling the new vehicle request at the adjusted arrival time (block 822). As another example, the user can reschedule the calendar event for a different time or day. In such examples, the vehicle request can be scheduled based on the modified calendar event data.

If one or more of the vehicle requests in conflict are not rescheduled or grouped as a rideshare event, the example method 800 includes denying the one or more of the vehicle requests (block 824). For example, the new vehicle request may be in conflict with a previously scheduled event that has been assigned a high priority indicating the event cannot be rescheduled. If the user associated with the new vehicle request does not approve rescheduling of the request, then the new vehicle request is denied. The request confirmer 606 can send an alert to the user application 120 instructing the user application 120 to populate the vehicle arrival time field 212 of the first example screen 200 with an indicator that the vehicle is unavailable. The example method 800 ends with monitoring for calendar events with new vehicle requests and/or modifications to the calendar event data and/or vehicle requests to dynamically identify and respond to scheduling conflicts (block 826).

The flowcharts of FIGS. 7-8 are representative of example methods that may be used to implement the example system 100 of FIGS. 1-6. In these examples, the methods may be implemented using machine-readable instructions that comprise a program for execution by a processor such as the processor 912 shown in the example processor platform 900, discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 7-8, many other methods of implementing the example system 100 may alternatively be used. For example, the order of execution of the blocks may be changed, and/or some of the blocks described may be changed, eliminated, or combined.

As mentioned above, the example processes of FIGS. 7-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
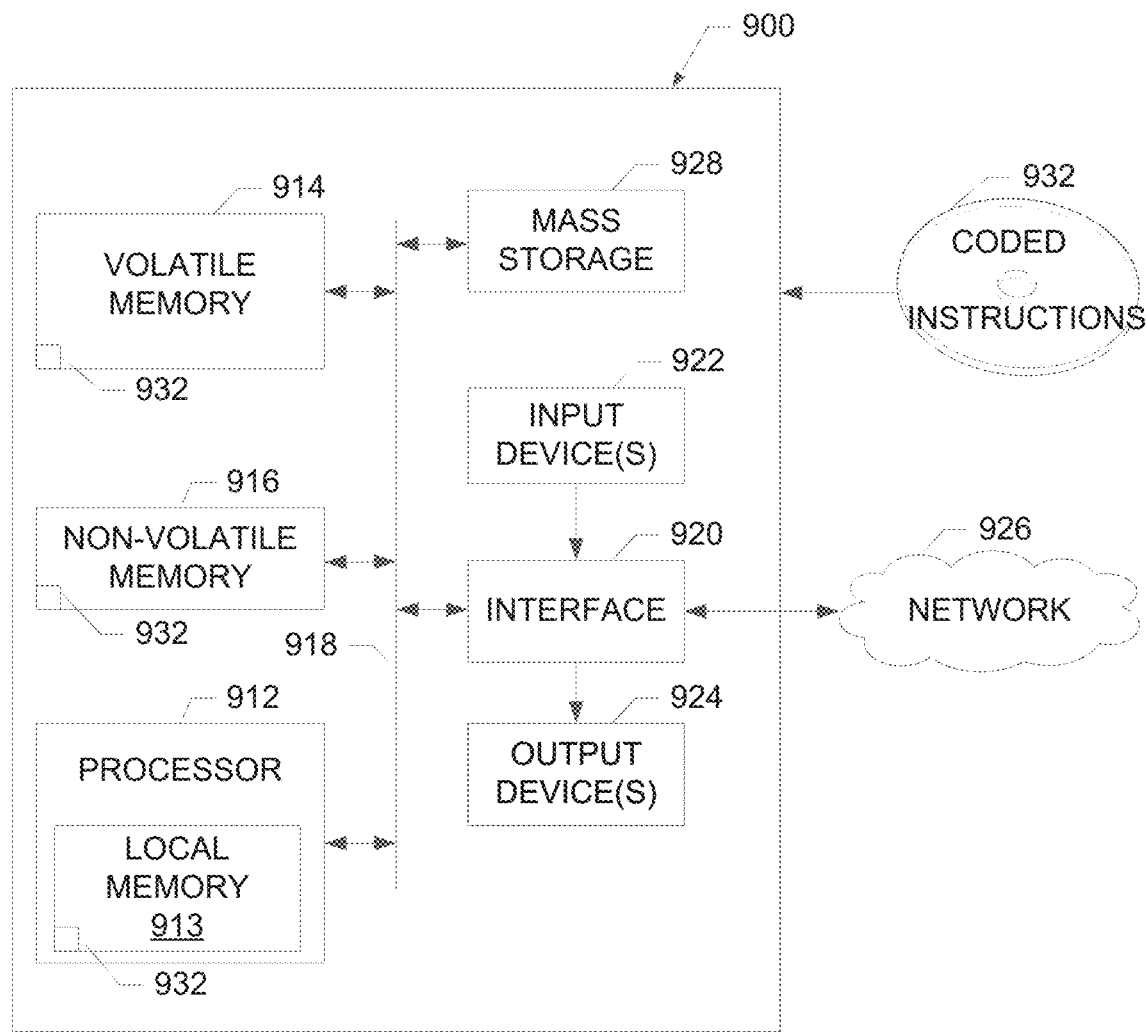
FIG. 9 is a diagram of an example processor platform that may be used to carry out the example methods of FIGS. 7 and 8 and/or, more generally, to implement the example system of FIG. 1.

FIG. 9 is a block diagram of an example processor platform 900 capable of executing instructions to implement the methods of FIGS. 7-8 and the example system 100 of FIGS. 1-6. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 of FIG. 9 may be stored in the mass storage device 928, in the volatile memory 914, in the non-volatile memory 916, and/or on a removable tangible computer readable storage medium such as a CD or DVD.

From the foregoing, it will be appreciated that the above disclosed systems, methods, and apparatus provide for efficient scheduling of calendar events and requests for use of an autonomous vehicle in connection with the calendar events through a single user application installed on a user device such as a smartphone. The disclosed examples eliminate the need for the user to access different applications or interfaces for scheduling calendar events and requesting the vehicle. Rather, the disclosed examples provide for the integration of vehicle requests with known calendar user applications. The disclosed examples also predict future calendar events and vehicle requests based on historical data analyses and automatically schedule the events via the user application to provide for efficient and intelligent calendar management.

The disclosed examples also manage scheduling demands placed on the vehicle in view of multiple users requesting the vehicle for different calendar events. The vehicle requests generated at the respective user devices are transmitted to a central scheduler associated with the vehicle. The scheduler evaluates the requests and associated calendar event data, identifies conflicts, determines rescheduling options, and provides feedback to the users via the user application as to the availability of the vehicle in response to the requests. The scheduler automatically calculates travel times and determines arrival times for the vehicle based on factors such as location, route, arrival buffer times, user preferences, etc. Further, the disclosed examples promote efficient use of the vehicle by identifying opportunities for ridesharing between users.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
memory;
machine readable instructions; and
processor circuitry to execute the machine readable instructions to:
determine that a calendar request for an autonomous vehicle is associated with a location or a route previously associated with the autonomous vehicle, the route associated with the location, the calendar request to be generated via a user interface application;
generate a predicted request for the autonomous vehicle in response to the determination that the calendar request is associated with the location or the route previously associated with the autonomous vehicle;
cause the user interface application to auto-populate a vehicle request field of the user interface application based on the generation of the predicted request for the autonomous vehicle;
cause the user interface application including the populated vehicle request field to be output for display;
detect confirmation of the predicted request based on a first user input received via the user interface application when the user interface application includes the populated vehicle request field;
in response to the confirmation, cause the user interface application to output a prompt for a user to select a pickup position at the location;
identify the pickup position based on a second user input via the user interface application; and transmit an instruction to the autonomous vehicle to cause the autonomous vehicle to travel to the pickup position based on a time associated with the predicted request.

2. The apparatus of claim 1, wherein the processor circuitry is to:
determine that the predicted request is not in conflict with another request for the autonomous vehicle; and
cause the user interface application to populate the vehicle request field based on the determination.

3. The apparatus of claim 1, wherein the processor circuitry is to:
determine a vehicle arrival buffer time for the predicted request; and
cause the user interface application to populate an arrival buffer field of the user interface application with the vehicle arrival buffer time in response to the generation of the predicted request.

4. The apparatus of claim 3, wherein the processor circuitry is to determine the vehicle arrival buffer time based on historical vehicle arrival buffer time data.

5. The apparatus of claim 1, wherein the time includes an arrival time at the pickup position and the processor circuitry is to schedule the autonomous vehicle for the calendar request in response to the confirmation and based on the arrival time.

6. A method comprising:
receiving, via a first processor, first calendar event data, the first calendar event data to be transmitted to the first processor from a second processor;
determining, by executing an instruction with the first processor, that the first calendar event data does not include a request for an autonomous vehicle;
in response to determining that the first calendar event data does not include the request for the autonomous vehicle, generating, by executing an instruction with the first processor, a predicted request for the autonomous vehicle based on the first calendar event data and second calendar event data, the predicted request associated with the first calendar event data;
instructing, by executing an instruction with the first processor, the second processor to cause a user interface application to auto-populate a vehicle request field of the user interface application based on the generation of the predicted request;
instructing, by executing an instruction with the first processor, the second processor to cause the user interface application including the populated vehicle request field to be output for display;
verifying, by executing an instruction with the first processor, the predicted request based on a first user input received via the user interface application when the user interface application includes the populated vehicle request field;
in response to the verification, instructing, by executing an instruction with the first processor, the second processor to cause the user interface application to output a prompt for a user to select a pickup positions;
identifying, by executing an instruction with the first processor, the pickup position based on a second user input received via the user interface application;
scheduling, by executing an instruction with the first processor, the predicted request for the autonomous vehicle; and
causing, by executing an instruction with the first processor, the autonomous vehicle to travel to the pickup position based on the scheduled predicted request.

7. The method of claim 6, further including identifying that the first calendar event data includes a route or a location associated with the second calendar event data, wherein the generating of the predicted request is based on the route or the location.

8. The method of claim 6, further including predicting third calendar event data based on one or more of the first calendar event data or the second calendar event data.

9. The method of claim 8, further including predicting a setting for the autonomous vehicle for the third calendar event data based on the one or more of the first calendar event data or the second calendar event data.

10. The method of claim 9, wherein the setting includes one or more of a heat setting, a radio setting, or a vehicle door setting.

11. The method of claim 8, wherein the third calendar event data includes at least a first predicted calendar event and a second predicted calendar event, the second predicted calendar event predicted to occur after the first predicted calendar event.

12. The method of claim 6, further including:
predicting an arrival buffer time for the predicted request based on the first calendar event data and the second calendar event data; and
calculating an arrival time for the autonomous vehicle based on the first calendar event data and the predicted arrival buffer time.

13. The method of claim 6, wherein the scheduling of the predicted request is in response to the verification and based on a time associated with the first calendar event data.

14. A non-transitory computer readable medium comprising instructions that, when executed, cause a machine to at least:
predict a first request for an autonomous vehicle based on calendar event data;
verify that the first request does not conflict with a second request for the autonomous vehicle;
cause a user interface application to auto-populate a vehicle request field of the user interface application in response to the verification;
cause the user interface application including the populated vehicle request field to be output for display;
detect confirmation of the first request based on a first user input received via the user interface application when the user interface application includes the populated vehicle request field;
in response to the confirmation, cause the user interface application to output a prompt for a user to select a pickup position;
identify the pickup position based on a second user input received via the user interface application; and
cause the autonomous vehicle to travel to the pickup position based on a time associated with the calendar event data.

15. The non-transitory computer readable medium of claim 14, wherein the calendar event data includes a first calendar event and a second calendar event, the first calendar event occurring before the second calendar event, and the instructions, when executed, cause the machine to predict the first request for the second calendar event.

16. The non-transitory computer readable medium of claim 14, wherein the instructions, when executed, cause the machine to verify that the first request does not conflict with the second request by comparing one or more of (a) a vehicle arrival time associated with the first request and a vehicle request time associated with the second request or (b) a location associated with the first request and a location associated with the second request.

17. The non-transitory computer readable medium of claim 14, wherein the instructions, when executed, cause the machine predict the first request based on location data or route data associated with the calendar event data.

18. The non-transitory computer readable medium of claim 14, wherein the instructions, when executed, cause the machine to:
   determine a vehicle arrival buffer time for the first request; and
   cause the user interface application to populate an arrival buffer field of the user interface application with the vehicle arrival buffer time in response to the verification.

19. The non-transitory computer readable medium of claim 14, wherein the calendar event data is first calendar event data and the instructions, when executed, cause the machine to generate second calendar event data based on the first calendar event data, the second calendar event data including a re-occurring calendar entries including the first request.

* * * * *